(12) United States Patent
Winoto et al.

(10) Patent No.: US 10,008,736 B2
(45) Date of Patent: Jun. 26, 2018

(54) METHOD FOR FORMING AND PROCESSING ANTIPEROVSKITE MATERIAL DOPED WITH ALUMINUM MATERIAL

(71) Applicant: QuantumScape Corporation, San Jose, CA (US)

(72) Inventors: Adrian Winoto, San Francisco, CA (US); Anna Choi, San Jose, CA (US); Joseph Han, Redwood City, CA (US); Will Hudson, Belmont, CA (US); Tim Holme, Mountain View, CA (US); Cheng Chieh Chao, Santa Clara, CA (US)

(73) Assignee: QuantumScape Corporation, San Jose, CA (US)

( * ) Notice: Subject to any disclaimer, the term of this patent is extended or adjusted under 35 U.S.C. 154(b) by 571 days.

(21) Appl. No.: 14/060,618

(22) Filed: Oct. 23, 2013

(65) Prior Publication Data

US 2014/0113187 A1    Apr. 24, 2014

Related U.S. Application Data

(60) Provisional application No. 61/717,517, filed on Oct. 23, 2012, provisional application No. 61/767,674, (Continued)

(51) Int. Cl.
  *H01M 10/0525* (2010.01)
  *H01M 10/0562* (2010.01)
  (Continued)

(52) U.S. Cl.
  CPC .......... *H01M 10/0525* (2013.01); *C01G 1/00* (2013.01); *H01M 6/186* (2013.01); *H01M 10/054* (2013.01); *H01M 10/0562* (2013.01); *C01P 2002/50* (2013.01); *C01P 2002/85* (2013.01); *C01P 2002/88* (2013.01);
  (Continued)

(58) Field of Classification Search
  CPC ............... H01M 10/05; H01M 10/052; H01M 10/0525; H01M 10/0562; H01M 10/054; H01M 2300/0068; H01M 2300/0094; C01G 1/00; C01P 2002/89; C01P 2004/03; C01P 2006/40; C01P 2002/50; C01P 2002/85; C01P 2002/88
  See application file for complete search history.

(56) References Cited

U.S. PATENT DOCUMENTS

| | | | |
|---|---|---|---|
| 9,246,188 B2 * | 1/2016 | Zhao | H01M 10/0562 |
| 2009/0202905 A1 * | 8/2009 | Morita | H01M 4/5825 429/212 |
| 2013/0202971 A1 | 8/2013 | Zhao et al. | |

OTHER PUBLICATIONS

Lu et al. "Defect chemistry and lithium transport in Li3OCl antiperovskite superionic conductors." Phys. Chem. Chem. Phys., 2015, 17, 32547-32555, available Oct. 2015.*

(Continued)

*Primary Examiner* — Michael L Dignan
(74) *Attorney, Agent, or Firm* — Squire Patton Boggs (US) LLP

(57) ABSTRACT

The present invention is related to formation and processing of antiperovskite material. In various embodiments, a thin film of aluminum doped antiperovskite is deposited on a substrate, which can be an electrolyte material of a lithium-based electrochemical storage device.

5 Claims, 20 Drawing Sheets

Related U.S. Application Data filed on Feb. 21, 2013, provisional application No. 61/875,699, filed on Sep. 10, 2013.

(51) Int. Cl.
*C01G 1/00* (2006.01)
*H01M 10/054* (2010.01)
*H01M 6/18* (2006.01)

(52) U.S. Cl.
CPC ...... *C01P 2002/89* (2013.01); *C01P 2004/03* (2013.01); *C01P 2006/40* (2013.01); *H01M 2300/0068* (2013.01); *H01M 2300/0094* (2013.01)

(56) References Cited

OTHER PUBLICATIONS

Emly et al. "Phase Stability and Transport Mechanisms in Antiperovskite Li3OCl and Li3OBr Superionic Conductors." Chem. Mater. 2013, 25, 4663-4670, available Nov. 2013.*

D.J. Schroeder, A.A. Hubaud, J.T. Vaughey, Stability of the Solid Electrolyte Li3OBr to Common Battery Solvents, Materials Research Bulletin (2013), http://dx.doi.org/10.1016/j.materresbull.2013.10.006.

Georg Schwering, Andreas Hönnerscheid, Leo van Wüllen, and Martin Jansen, High Lithium Ionic Conductivity in the Lithium Halide Hydrates $Li_{3-n}(OH_n)Cl$ ($0.83 \leq n \leq 2$) and $Li_{3-n}(OH_n)Br$ ($1 \leq n \leq 2$) at Ambient Temperatures, Chemphyschem 2003, 4, 343-348.

Jianzhong Zhang, Jiantao Han, Zhijun Lin, Maria H. Braga, Luke L. Daemen, Liping Wang, and Yusheng Zhao, High-pressure high-temperature synthesis of lithium-rich $Li_3O(Cl, Br)$ and $Li_{3-x}Ca_{x/2}OCl$ anti-perovskite halides for solid electrolytes, Los Alamos Neutron Science Center, Los Alamos National Laboratory, Los Alamos, NM 87545 USA.

H. Barlage and H. Jacobs, Li,I(OH): Eine Verbindung mit eindimensional unendlich kantenverknüpften $[Li_{4/2}(OH)]$-Pyramiden, Z. anorg. allg. Chem. 620 (1994) 475-478.

C. Eilbracht, W. Kockelmann, D. Hohlwein, H. Jacobs, Orientational disorder in perovskite like structures of $Li_2X(OD)$ (X=Cl, Br) and $LiBr \cdot D_2O$, Physica B 234-236 (1997) 48-50.

Yusheng Zhao, and Luke L. Daemen, Superionic Conductivity in Lithium-Rich Anti-Perovskites, J. Am. Chem. Soc. 2012, 134, 15042-15047.

Olaf Reckeweg, Björn Blaschkowski, and Thomas Schleid, $Li_5OCl_3$ and $Li_3OCl$: Two Remarkably Different Lithium Oxide Chlorides, Z. Anorg. Allg. Chem. 2012, 638, (12-13), 2081-2086.

W. Weppner, P. Hartwig and A. Rabenau, Consideration of Lithium Nitride Halides as Solid Electrolytes in Practical Galvanic Cell Applications, Journal of Power Sources, 6 (1981) 251-259.

O. Nakamura and J.B. Goodenough, Conductivity Enhancement of Lithium Bromide Monohydrate by $Al_2O_3$ Particles, Solid State Ionics 7 (1982) 119-123.

P. Hartwig and W. Weppner, Ionic Conductivities of Lithium-Halide-Based Quaternary Compounds, Solid State Ionics 3/4 (1981) 249-254.

N. Hessel Andersen, J. K. Kjems and F.W. Poulsen, Neutron Scattering Studies of the Ionic Conductor $LiI \cdot D_2O$, Physica Scripta. vol. 25, 780-784, 1982.

P. Hartwig, A. Rabenau and W. Weppner, Lithium Hydroxide Halides: Phase Equilibria and Ionic Conductivities, Journal of the Less-Common Metals, 78 (1981) 227-233.

* cited by examiner

| Etch Time (s) | 0.4:1 LiOH:LiCl | 1:1 LiOH:LiCl | | 2:1 LiOH:LiCl | | 4:1 LiOH:LiCl | | 10:1 LiOH:LiCl | |
|---|---|---|---|---|---|---|---|---|---|
| 0 | $Li_{0.9}OCl_{0.4}$ | $Li_{1.5}OCl_{0.9}$ | $Li_{1.0}OCl_{0.9}$ | $Li_{0.9}OCl_{0.6}$ | $Li_{0.9}OCl_{0.3}$ | $Li_{0.8}OCl_{0.3}$ | $Li_{0.4}OCl_{0.06}$ | $Li_{1.0}OCl_{0.1}$ | $Li_{0.9}OCl_{0.05}$ |
| 0 | $Li_{0.9}OCl_{0.4}$ | $Li_{1.3}OCl_{0.9}$ | $Li_{0.9}OCl_{0.6}$ | $Li_{1.1}OCl_{0.8}$ | $Li_{1.0}OCl_{0.3}$ | $Li_{0.6}OCl_{0.3}$ | $Li_{0.4}OCl_{0.05}$ | $Li_{0.9}OCl_{0.1}$ | $Li_{0.6}OCl_{0.05}$ |
| 120 | $Li_{2.4}OCl_{1.7}$ | $Li_{1.5}OCl_{1.2}$ | $Li_{1.5}OCl_{1.2}$ | $Li_{1.1}OCl_{0.7}$ | $Li_{0.7}OCl_{0.3}$ | $Li_{0.6}OCl_{0.05}$ | $Li_{0.3}OCl_{0.08}$ | $Li_{1.0}OCl_{0.2}$ | $Li_{0.6}OCl_{0.05}$ |
| 240 | $Li_{2.7}OCl_{1.9}$ | $Li_{1.6}OCl_{1.2}$ | $Li_{1.6}OCl_{1.3}$ | $Li_{1.2}OCl_{0.7}$ | $Li_{0.6}OCl_{0.3}$ | $Li_{0.7}OCl_{0.04}$ | $Li_{0.3}OCl_{0.09}$ | $Li_{1.1}OCl_{0.3}$ | $Li_{0.6}OCl_{0.04}$ |
| 360 | $Li_{2.3}OCl_{1.9}$ | $Li_{1.4}OCl_{1.2}$ | $Li_{1.3}OCl_{1.3}$ | $Li_{0.9}OCl_{0.7}$ | $Li_{0.5}OCl_{0.3}$ | $Li_{0.6}OCl_{0.05}$ | $Li_{0.3}OCl_{0.05}$ | $Li_{0.8}OCl_{0.3}$ | $Li_{0.6}OCl_{0.04}$ |
| 480 | | | | | $Li_{0.5}OCl_{0.3}$ | | $Li_{0.2}OCl_{0.08}$ | | |
| 600 | | | | | $Li_{0.4}OCl_{0.3}$ | | $Li_{0.2}OCl_{0.08}$ | | |
| Anneal Temp (°C) | 280°C SP | 230°C SP | 280°C SP | 180°C SP | 280°C SP | 230°C SP | 280°C SP | 330°C SP | 280°C SP |

Figure 3

Figure 4B

METHOD FOR FORMING AND PROCESSING ANTIPEROVSKITE MATERIAL DOPED WITH ALUMINUM MATERIAL

CROSS-REFERENCES TO RELATED APPLICATIONS

This application claims priority to the following provisional applications, all of which are incorporated by reference herein for all purposes:

U.S. Provisional Patent Application No. 61/717,517, filed 23 Oct. 2012, entitled "SOLID ELECTROLYTE FOR BATTERY CELLS";

U.S. Provisional Application No. 61/767,674, filed Feb. 21, 2013, entitled "METHOD FOR FORMING AND PROCESSING ANTIPEROVSKITE MATERIAL"; and U.S. Provisional Application No. 61/875,699, filed 10 Sep. 2013, entitled "METHOD FOR FORMING AND PROCESSING ANTIPEROVSKITE MATERIAL DOPED WITH ALUMINUM MATERIAL".

BACKGROUND OF THE INVENTION

The present invention is related to formation and processing of antiperovskite material.

Batteries with solid-state electrolytes have many advantages and benefits. Antiperovskite material can be very useful for solid-state batteries. Conventional methods and system for forming antiperovskite material used in batteries have been inadequate. It is desirable to have new and improved methods for forming and processing antiperovskite material.

BRIEF DESCRIPTION OF THE DRAWINGS

FIG. 3 is a chart illustrating XPS composition in film depth for different precursor materials used in forming antiperovskite material according to embodiments of the present invention.

FIG. 4B is a diagram showing SEM images of thin films of antiperovskite formed at different temperatures according to embodiments of the present invention.

DETAILED DESCRIPTION OF THE INVENTION

Figure 1A:
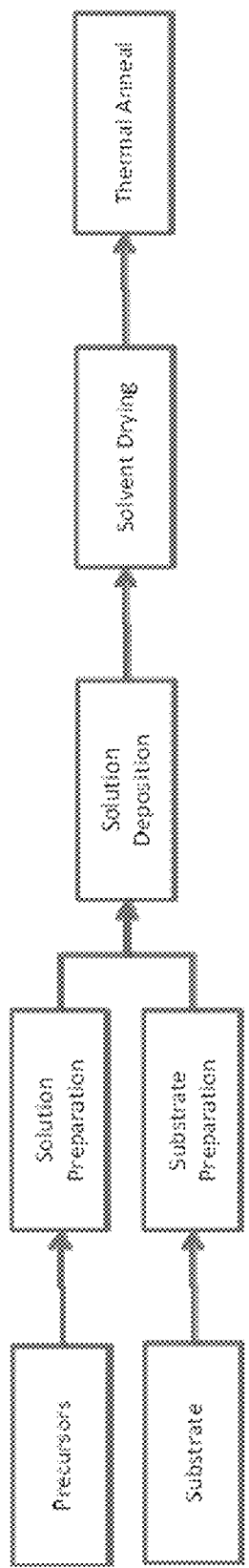
FIG. 1A is a simplified flow diagram illustrating a general process for antiperovskite material according to an embodiment of the present invention.

The present invention is related to formation and processing of antiperovskite material. In various embodiments, a thin film of antiperovskite is deposited on a substrate, which can be an electrode of a lithium-based electrochemical storage device. The antiperovskite material is doped with aluminum material. There are other embodiments as well.

Embodiments of the present invention provides thin film and solid state electrolytes for lithium ion batteries. The formation and use thereof of antiperovskite material enables a metallic lithium anode, which increases the capacity and therefore the energy density of any lithium-based electrochemical storage device.

As explained above, solid-state batteries are useful for various applications. Lithium metal anodes are particularly useful in solid-state batteries. Lithium metal anodes are advantageous in that they have higher capacity than traditional graphite anodes. Therefore, a battery with a lithium metal anode can have a higher energy density. However, Li-anodes cannot be used in a traditional cell with a liquid electrolyte for safety reasons. For example, lithium plating is known to occur unevenly and with positive feedback, where lithium dendrites eventually grow across the anode to the cathode, thereby shorting the cell and resulting in rapid energy release. A solid-state electrolyte, in contrast, prevents dendrite formation by virtue of its mechanical stiffness. Therefore, solid state electrolytes can improve the energy density of a battery.

Traditional solid state electrolytes such as lithium phosphorus oxynitride (LiPON) have low conductivity at room temperature. The low conductivity limits the recharge time, power density, and capacity of a battery. Therefore, traditional solid state batteries have been confined to microbatteries of ≤1 mAh capacity. At the other end of the spectrum lie sintered sulfide materials with high conductivity that cannot be applied in a thin film format. Batteries with such electrolytes will have low energy density due to the thick electrolyte. Table 1 below compares various types of battery material:

TABLE 1

| | PROs | CONs |
|---|---|---|
| Polymers (PEO . . . ) | May resist dendrites | Low conductivity at <60° C., thick films |
| Liquid electrolyte + separator | Highest conductivity | Poor safety attributes, cannot be used with Li anodes |
| Gels | Acceptable conductivity | Cannot be used with Li anodes |
| RTILs | Acceptable conductivity | Cannot be used with Li anodes |
| LiPON, Li8SiAlO9 | High stability | Low conductivity |
| Li2S-based glasses | Acceptable conductivity | Low air-stability, thick pellets, often unstable to lithium |
| Li2S-based crystals | High conductivity | Low air-stability, thick pellets, often unstable vs Li |
| Garnets | Acceptable conductivity, excellent stability & safety | Thick pellets |

In an embodiment, the present invention provide a solution based method to produce antiperovskite in a thin film platform. It is to be appreciated that solid-state electrolyte in a thin film format allows the ability to use a lithium anode in a battery. This, in turn, can increase capacity and energy density of the battery.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

It is to be appreciated that the ability to process antiperovskite in a thin film platform enables manufacturability of the material at large scale. Embodiments of the present invention provide processing method involves initial formulation (dissolution) of precursors in a variety of compatible solvent and solvent systems (both aqueous or non-aqueous based), and at a range of concentrations. Precursor materials are mixed at the desired stoichiometry ratios to achieve the desired material and structure.

In an embodiment, processing using a solution based approach involves substrate surface preparation. Substrate preparation involves a chemical or a physical treatment of the substrate's surface. Solution and substrate preparation is followed by deposition of the material onto the substrate. For example, the solution is applied as a thin wet film deposited via spray, spin, or other blanket (slot die, doctor blade, etc.) coating methods on desired substrate. The deposition process can be coupled to or precedes a drying step. A thermal anneal step is performed to achieve the final desired material (i.e., antiperovskite).

FIG. 1A is a simplified flow diagram illustrating a general process for antiperovskite material according to an embodiment of the present invention. This diagram is merely an example, which should not unduly limit the scope of the claims. One of ordinary skill in the art would recognize many variations, alternatives, and modifications. One or more steps illustrated in FIG. 1A can be added, removed, repeated, replaced, modified, and/or overlapped.

As shown in FIG. 1A, precursors are prepared in a solution. A substrate, on which the precursors are to be deposited on, is also prepared. The solution is then deposited on the prepared substrate. After deposition, solvent is dried, followed by a thermal anneal process.

Figure 1B:
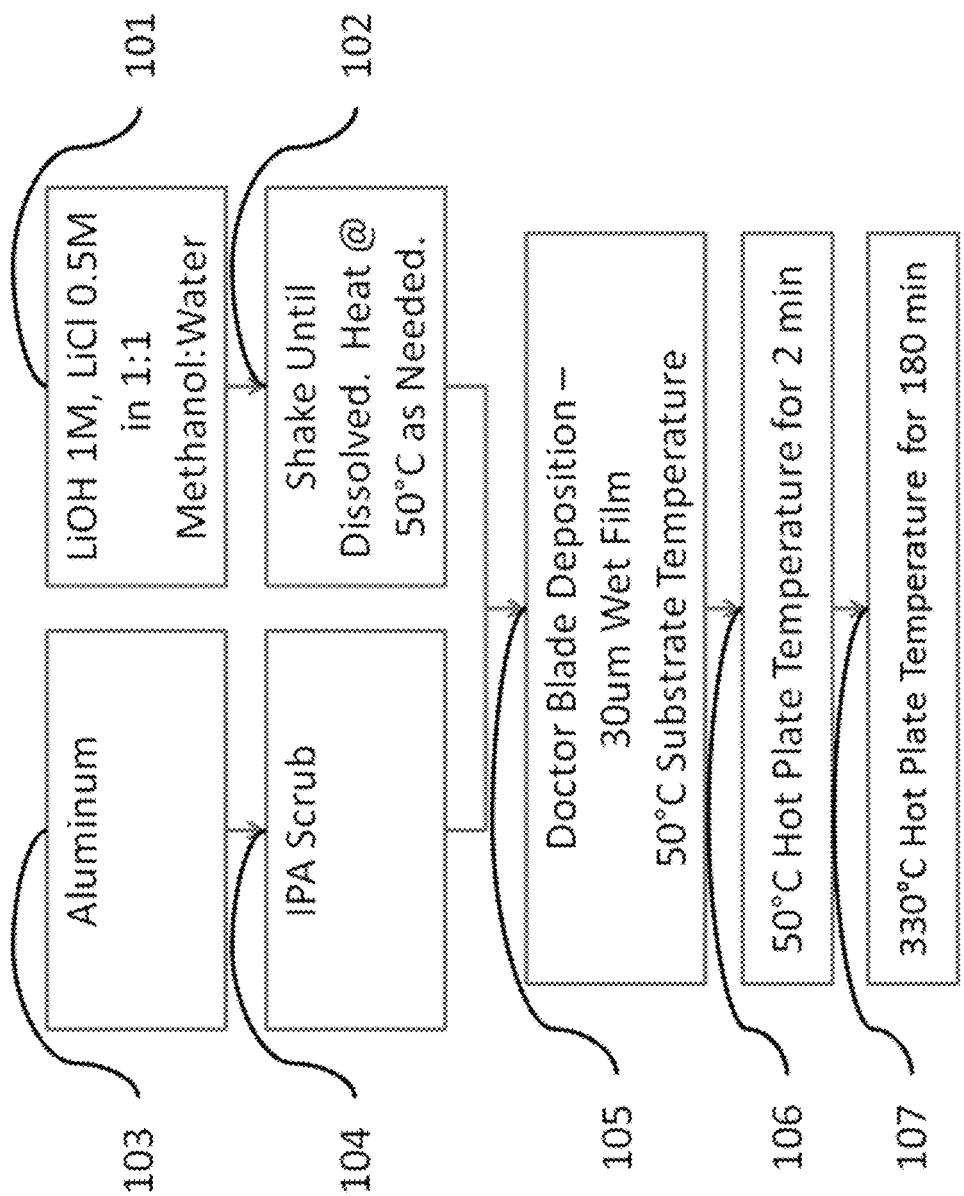
FIG. 1B is a simplified flow diagram illustrating a specific process for antiperovskite material according to an embodiment of the present invention.

FIG. 1B is a simplified flow diagram illustrating a specific process for antiperovskite material according to an embodiment of the present invention. This diagram is merely an example, which should not unduly limit the scope of the claims. One of ordinary skill in the art would recognize many variations, alternatives, and modifications. One or more steps illustrated in FIG. 1A can be added, removed, repeated, replaced, modified, and/or overlapped.

At step 101, precursor materials are prepared. Initially, the precursors are formulated into solution. Precursor materials include lithium hydroxide (LiOH). In a preferred embodiment, the concentration of LiOH is about 1M (i.e., 1 mole/liter). Depending on the application, LiOH can be at concentration range from 0.01M to 2M. Precursor materials also include lithium chloride (LiCl). In a preferred embodiment, the concentration of LiCl is about 0.5M, but it is to be appreciated that other concentration or amounts are possible as well. The ratio between LiOH and LiCl can be around 2:1, which is chosen based on empirical data to maximize ionic conductivity. Stoichiometrically, 2:1, 1:1, and 4:3 represent useful LiOH:LiCl ratios to achieve desired material.

It is to be appreciated that other precursor materials can be used as well. Alternative oxygen precursors include lithium acetate, lithium carbonate, lithium oxide, lithium perchlorate and lithium nitrate. The lithium chloride material is used as a lithium source and as a chloride source for antiperovskites. Alternative halogen precursors include lithium bromide, lithium fluoride, lithium iodide.

At step 101, solvent is also provided. In various embodiments, methanol and water are used as a solvent. In a preferred embodiment, a 1:1 ratio between methanol and water is used for the solvent system. Among other things, methanol is used to lower surface tension of the fluid, as it helps improve wettability. Methanol is also used to minimize the amount of water. It is to be appreciated that at the end of the process, water is to be removed. Therefore, the more water that can be eliminated from the process initially, the less water needs to be removed from the system later on.

It is to be appreciated that lithium hydroxide is soluble in very few solvents. Water, methanol, and ethanol represent some of the solvents in which lithium hydroxide is soluble. Lithium chloride is soluble in more solvents than lithium hydroxide. For example, ethanol represents another possible solvent system. For other lithium precursors, butanol, DMSO, DMF can be used as a solvent. The type of solvent system is limited by the precursor with lowest solubility.

For solubility purposes as well as coatability reasons, the primary formulation according to embodiments of the present invention uses a 50%:50% blend of methanol and water. This ratio can be adjusted depending on wetting behavior desired and drying rate desired. A desired amount of lithium hydroxide is measured to make 1M final concentration for the primary formulation, but can be adjusted as necessary. The range of concentrations include 1M to 2M. Water is added to the lithium hydroxide. The solution is stirred and shaken until dissolved. A temperature of 50 degrees C. can be used to assist dissolution. Grinding of solid lithium hydroxide can also be performed to improve ease of dissolution. A desired amount of lithium chloride is added to make 0.5M final concentration. This can also range from 1M to 2M in solution. Desired amount of methanol is then added to the mixture. Ratios of LiOH:LiCl can be altered to achieve different material composition and structure. In various embodiments, for deposition involving doctor blade, the ratio of about 2:1 for LiOH to LiCl is used. The range of ratios tested and shown good ionic conductivity ranges from 0.4:1 ratio to 4:1 ratio of LiOH to LiCl. In an implementation, optimal ratios are 1:1, 4:3, and 2:1 LiOH:LiCl ratio because it represents the best stoichiometric ratios to achieve antiperovskite material.

In a specific embodiment, the addition of precursor material and solvent follows a specific order:
1. Lithium hydroxide
2. Water
3. Lithium chloride
4. Methanol It is to be appreciated that other sequences are possible as well.

Once materials are provided in step 101, they are dissolved in step 102. For example, the materials are mixed and shaken until they are dissolved in the solvent (i.e., water and methanol). As might be needed, the solution is heated to about 50 degrees C. to help dissolution of precursor material. Other temperatures can be used as well.

At step 103, aluminum material is provided as a substrate material. For example, the aluminum material is provided in the form of an aluminum foil. Depending on the application, other types of metal material can be used as substrate as well. For example, the aluminum material is used as substrate because it is used as a part of an in-situ processes, where the aluminum foil can be used a part of an electrode. Depending on the application, other types of material, such as, copper, nickel, and/or stainless steel can also be used The aluminum material is prepared at step 104. In a specific embodiment, an aluminum foil is wiped with clean room wipe using isopropyl alcohol (IPA). The aluminum or other types of substrate can be prepared in different ways as well.

The preparation of substrate (i.e., aluminum) can be performed in parallel to solution preparation. Among other things, preparation of substrate involves cleaning of the surface to allow for a uniform coating surface. Also, surface preparation is needed to improve coatability and adhesion. In an implementation, the substrate surface is coated with aluminum material. Wiping the surface of the aluminum with IPA removes the residual organics on the surface. More specifically, the IPA solution used has a sufficiently low surface tension for coatability that no further surface treatment is needed. Corona treatment, UV ozone treatment, atmospheric plasma, chemical etch, and/or other methods can also be used to treat the surface of the substrate effectively.

As explained above, the substrate can itself be a part of a battery that is later to be formed. For example, the substrate can be a negative electrode, negative current collector, positive electrode, positive current collector, or a carrier substrate for one of the above. The top layer of the substrate has good wettability by the solution, and the roughness should be less than the desired final film thickness. For example, wettability can be measured by low contact angle when a drop of solution is placed on the surface of the substrate. Wettability can also be characterized with surface energy, where high surface energy typically attributes to good wettability. For example, a quick test of wettability is to test hydrophilic/hydrophobic nature of the surface. Better surfaces show better hydrophilic properties.

Deposition process is performed in step 105. In an embodiment, a doctor blade with about 30 um height is used for manual drawdown deposition. About 0.5-1.0 mL of solution prepared in step 102 is deposited onto the cleaned aluminum material at a temperature of about 50 degrees C.

In a preferred embodiment, the deposition involves a blanket coating of the solution on the desired substrate (i.e., aluminum foil). For example, blanket coating can be performed in various ways, such as doctor blade application, slot die coating, spin coating, and roll coating. In certain embodiments, printing methods such as inkjet printing, flexo printing, and screen printing could also be used as a deposition method. In a specific embodiment, wet film with a thickness of about 30 um results in a deposited film thickness of about 5 um. For example, wet film coating thickness can go down as far as the roughness of the substrate to achieve a continuous thin film of antiperovskite.

In certain embodiments, substrate is a metal material that is later to be used to form a metal current collector in a battery. For example, the film can about 200 nm to about 60 um. Among other things, a 200 nm film will be limited by roughness of current collector. Thickness is associated with adhesion and cracking factors. If desired, the thickness can be high too. Typically, the high range is limited by adhesion and film cracking issues. The thickness in a dry film can be as thick as 60 um.

A moderately high or warm temperature is useful in a deposition process. For example, deposition is performed a heated substrate in a doctor blade deposition process. In a preferred embodiment, the substrate temperature set at about 50 degrees C. while the solution is applied. It is to be appreciated that other temperatures range are possible as well.

At step 106, the deposited substrate in dried. In a specific embodiment, the substrate is dried on a 50 degrees C. hot plate for about 2 minutes. For example, the substrate is positioned in an environment with a temperature of 50 C, thereby causing methanol and water to evaporate. Depending on the application, drying rate, uniformity, and mechanism are controlled to eliminate or limit pinhole formation and non-uniform drying patterns. When a different solvent system is used, optimal drying conditions vary.

At step 107, thermal annealing process is performed. Among other things, the thermal anneal step is needed to initiate the reaction between LiOH and LiCl. The reaction between LiOH and LiCl can be facilitated at a number of different temperatures and using a number of different equipment. In a specific embodiment, the annealing process is performed at a temperature of about 330 degrees C. for about 180 minutes. In an embodiment, good performance can be achieved in a vacuum oven managed environment atmosphere to remove residual water and hydrates. The process can have a wide range that achieves the desired material and performance metrics. In various embodiments, the temperature ranges of about 180 C to 400 C and duration of about 45 minutes to 3 days can be used depending on equipment and platforms. Depending on the implementation, the process can be performed in one-step or two-steps.

Figure 2A:
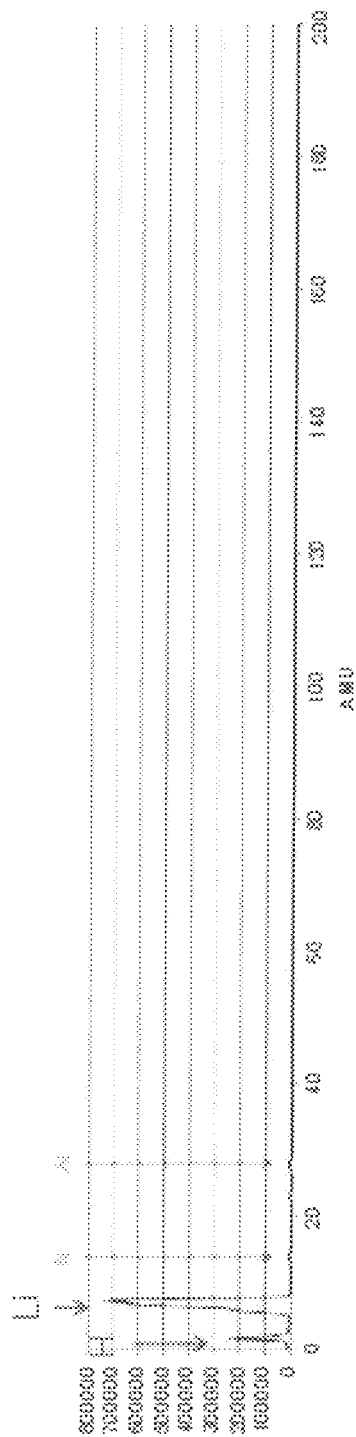
FIG. 2A is a SIMS spectrum illustrating composition of the antiperovskite material formed according to embodiments of the present invention.

FIG. 2A is a SIMS spectrum of antiperovskite material formed according to embodiments of the present invention. In the SIMS in FIG. 2A, a thin film antiperovskite formed using a deposition processes involving doctor blade tools. In the antiperovskite material, lithium is present and hydrogen is present. This is because the precursors include lithium-based material. The presence of hydrogen represents residual hydrate/water or hydroxide groups in the film from the precursor salt or solvent system. Low levels of nitrogen and aluminum are also present.

Figure 2B:
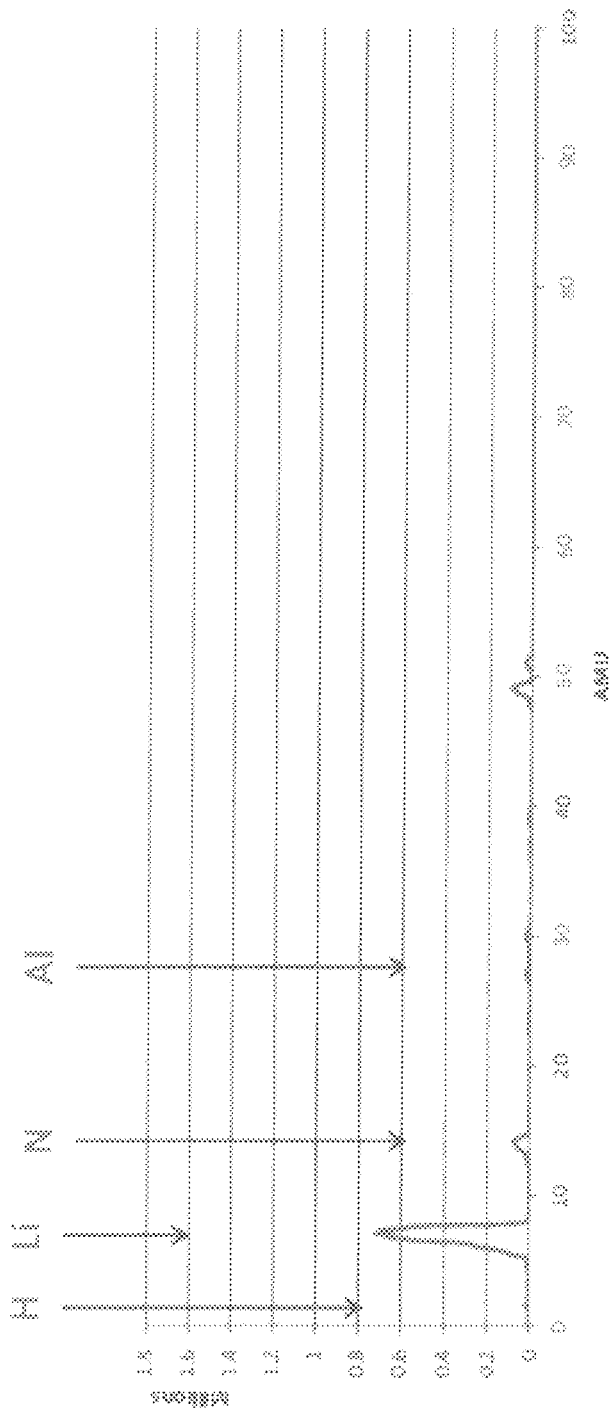
FIG. 2B is a SIMS spectrum illustrating composition of the antiperovskite material partially processed in a vacuum oven according to embodiments of the present invention.

FIG. 2B is a SIMS spectrum of antiperovskite material partially processed in a vacuum oven according to embodiments of the present invention. In the SIMS in FIG. 2B, the secondary ion mass spectrometry (SIMS) shows a thin film of antiperovskite formed using doctor blade tool(s) and thermally processed in vacuum oven. Hydrogen is present at a much lower level on the surface of the film compared to a non-vacuum step from FIG. 2A. The bulk of the film contains hydrogen.

FIG. 3 is a chart illustrating XPS composition in film depth for different precursor materials used in forming antiperovskite material according to embodiments of the present invention. This diagram is merely an example, which should not unduly limit the scope of the claims. One of ordinary skill in the art would recognize many variations, alternatives, and modifications. For example, XPS cannot detect hydrogen. The precursors, as used in processes described above where doctor blade(s) is used, can be applied using ratios shown in FIG. 3. Depending on the application, different ratios and different thermal treatments can provide different material compositions. In a specific embodiment, it is desirable for the stoichiometry to be formed is antiperovskite with high lithium relative to oxygen and chloride (e.g., closest to $Li_3OCl$).

Figure 4A:
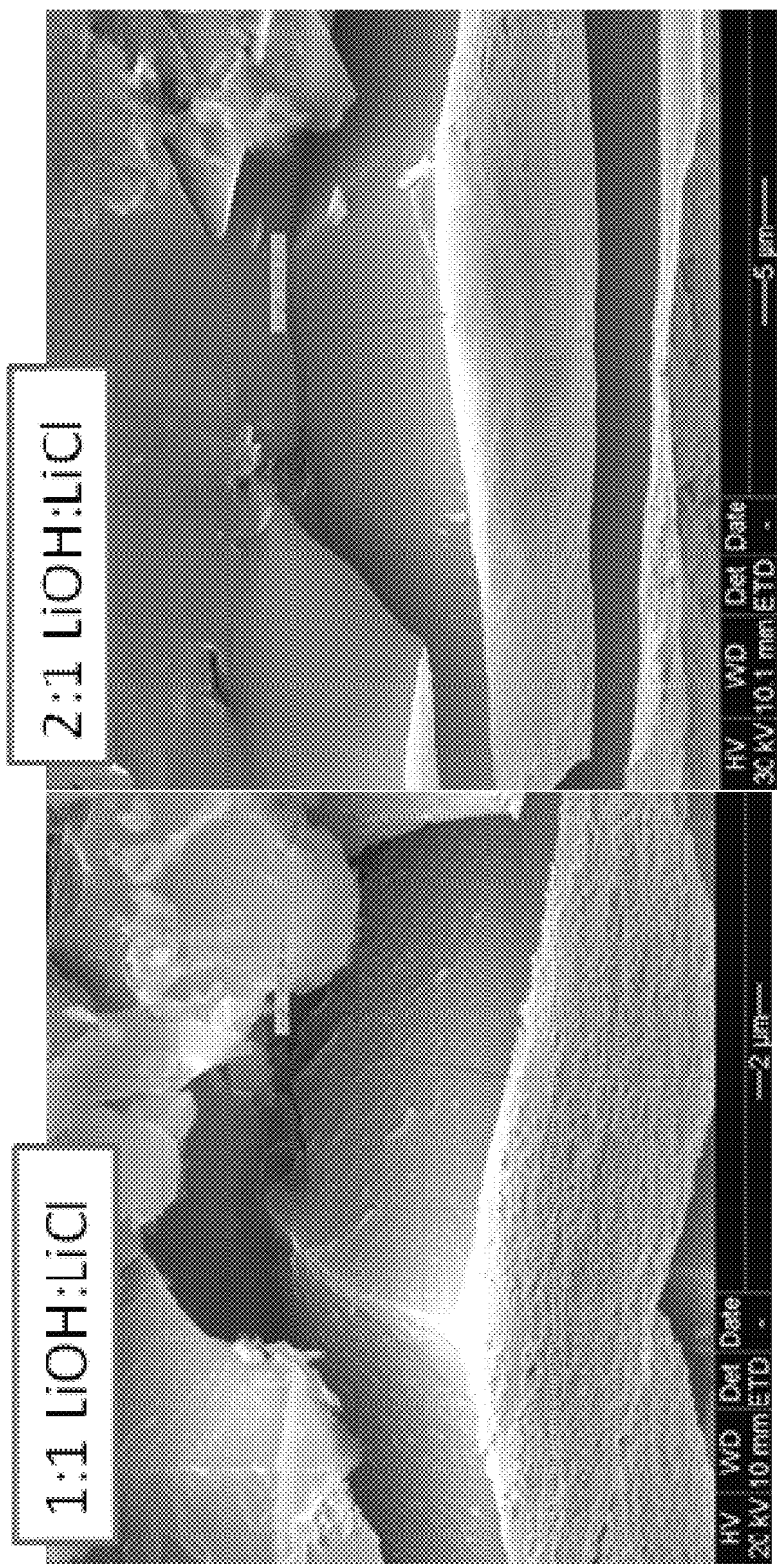
FIG. 4A is a diagram illustrating cross section imaging of thin-film antiperovskite material according to embodiments of the invention.

FIG. 4A is a diagram illustrating cross section imaging of thin-film antiperovskite material according to embodiments of the invention. More specifically, the scanning electron microscope (SEM) images illustrate thin film of antiperovskite material in different ratios. As shown, a ratio of 2:1 between LiOH:LiCl results in dense homogeneous thin film of antiperovskite. In contrast, a ratio of 1:1 between LiOH:LiCl ratio results in dense, but substantially heterogeneous thin film.

FIG. 4B is a diagram showing SEM images of thin films of antiperovskite formed at different temperatures according to embodiments of the present invention. Both images (left and right) show that the thin films of antiperovskite material are characterized with high ionic conductivity. For antiperovskite material formed at 330 degrees C. (as shown in the right), which is higher than 280 degrees C. (as shown in the left), the thin film material formed at higher temperature is characterized with a higher degree of homogeneous quality compared to lower temperatures. In addition, it can be seen thin films of antiperovskite material at both 280 degrees C. and 330 degrees C. are dense films.

Figure 4C:
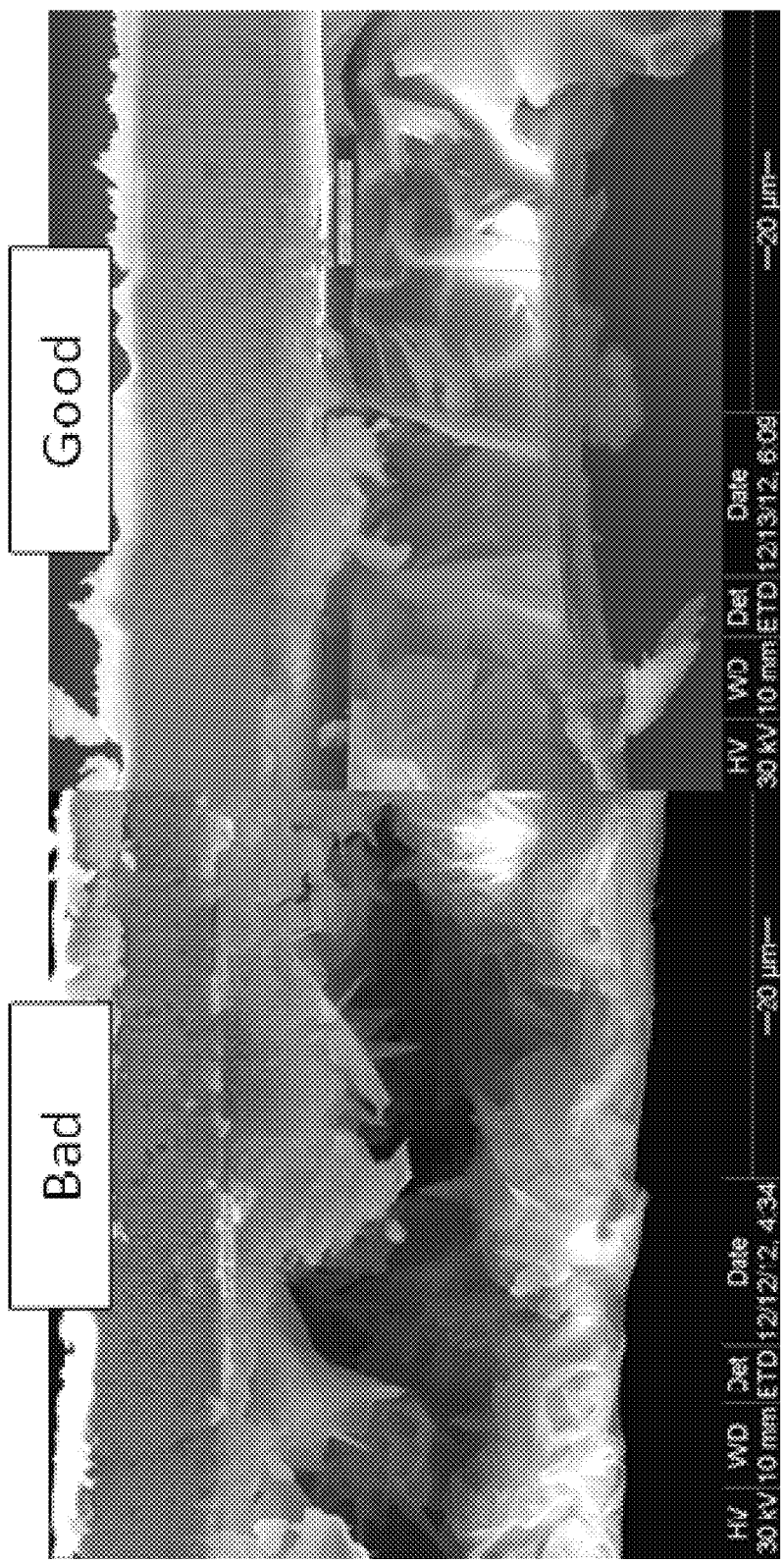
FIG. 4C is a diagram shown SEM images of thin films of antiperovskite material deposited on copper according to embodiments of the present invention.

FIG. 4C presents SEM images of thin films of antiperovskite material deposited on copper according to embodiments of the present invention. It is desirable to have antiperovskite material with good density. The image on the left represents a poor film due to the poor density of the film. In addition, the antiperovskite film on the left shows a relatively high degree of roughness. The image on the right illustrates a better film of antiperovskite material on copper, as it shows both higher density and surface smoothness.

Figure 5:
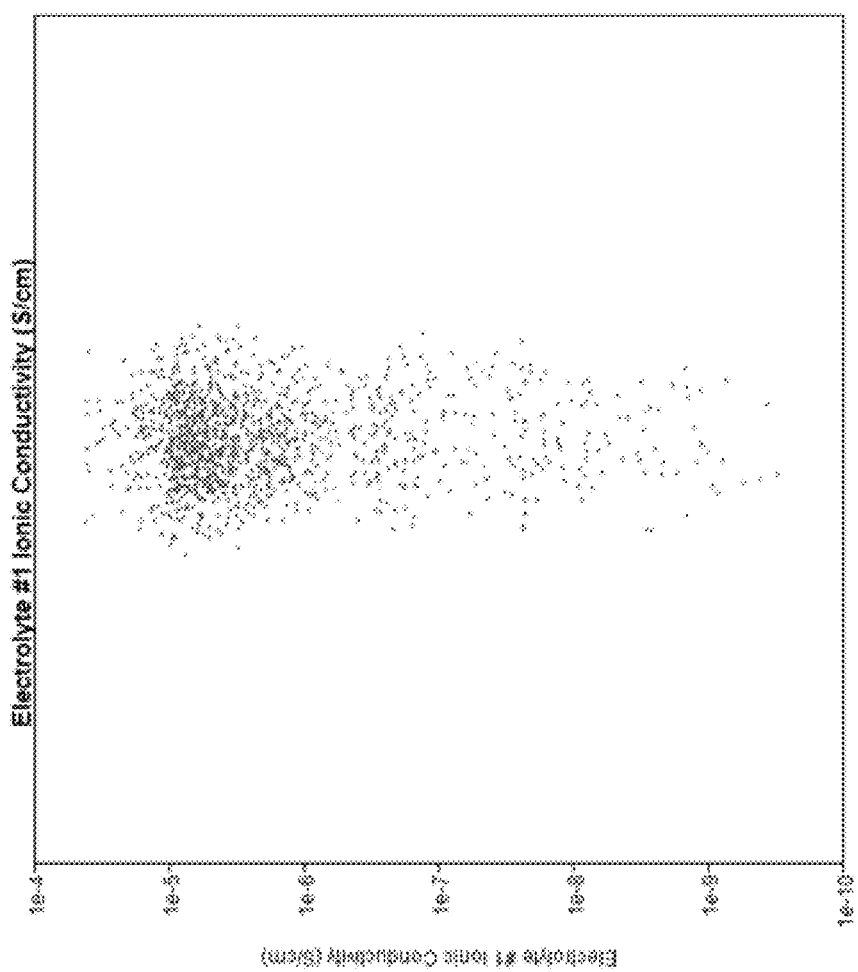
FIG. 5 is a simplified diagram illustrating ionic conductivity of antiperovskite material at about 30 degrees C. according to embodiments of the present invention.

FIG. 5 is a simplified diagram illustrating ionic conductivity of antiperovskite material when measured at about 30 degrees C. according to embodiments of the present invention.

Figure 6:
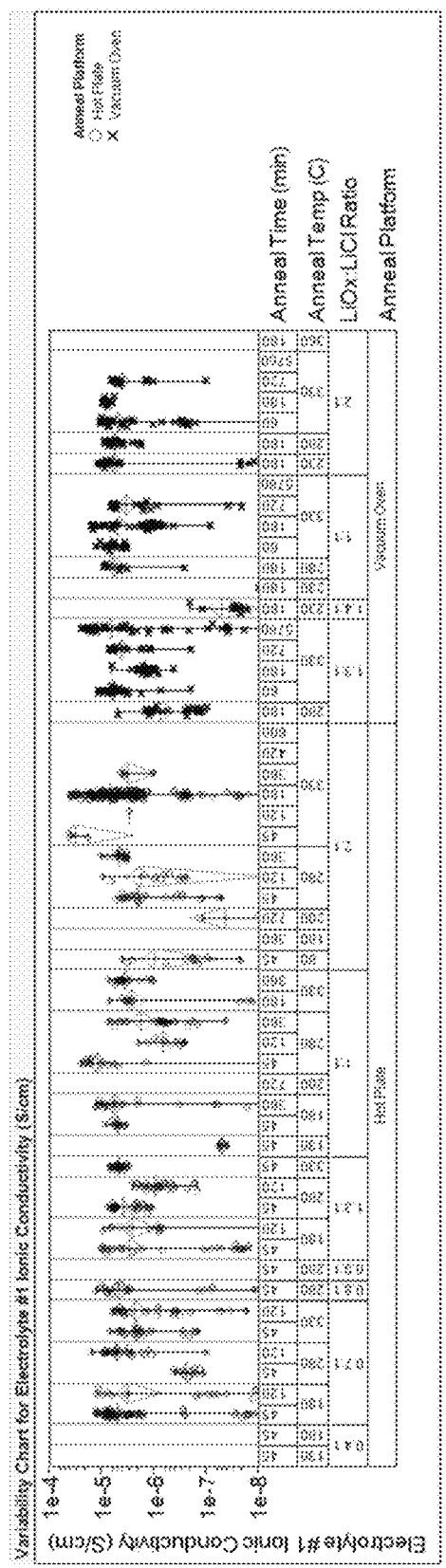
FIG. 6 is a simplified diagram illustrating relationship between ionic conductivity and processing conditions according to embodiments of the invention.

FIG. 6 is a simplified diagram illustrating relationship between ionic conductivity and processing conditions according to embodiments of the invention. As illustrated in FIG. 6, a low LiOH:LiCl ratio results in lower ionic conductivity performance. An anneal temperature of <180 C results in poor performance of thin film antiperovskite. Also, high temperature at extreme times (3-4 days) can lead to thin film with poor performance.

Figure 7A:
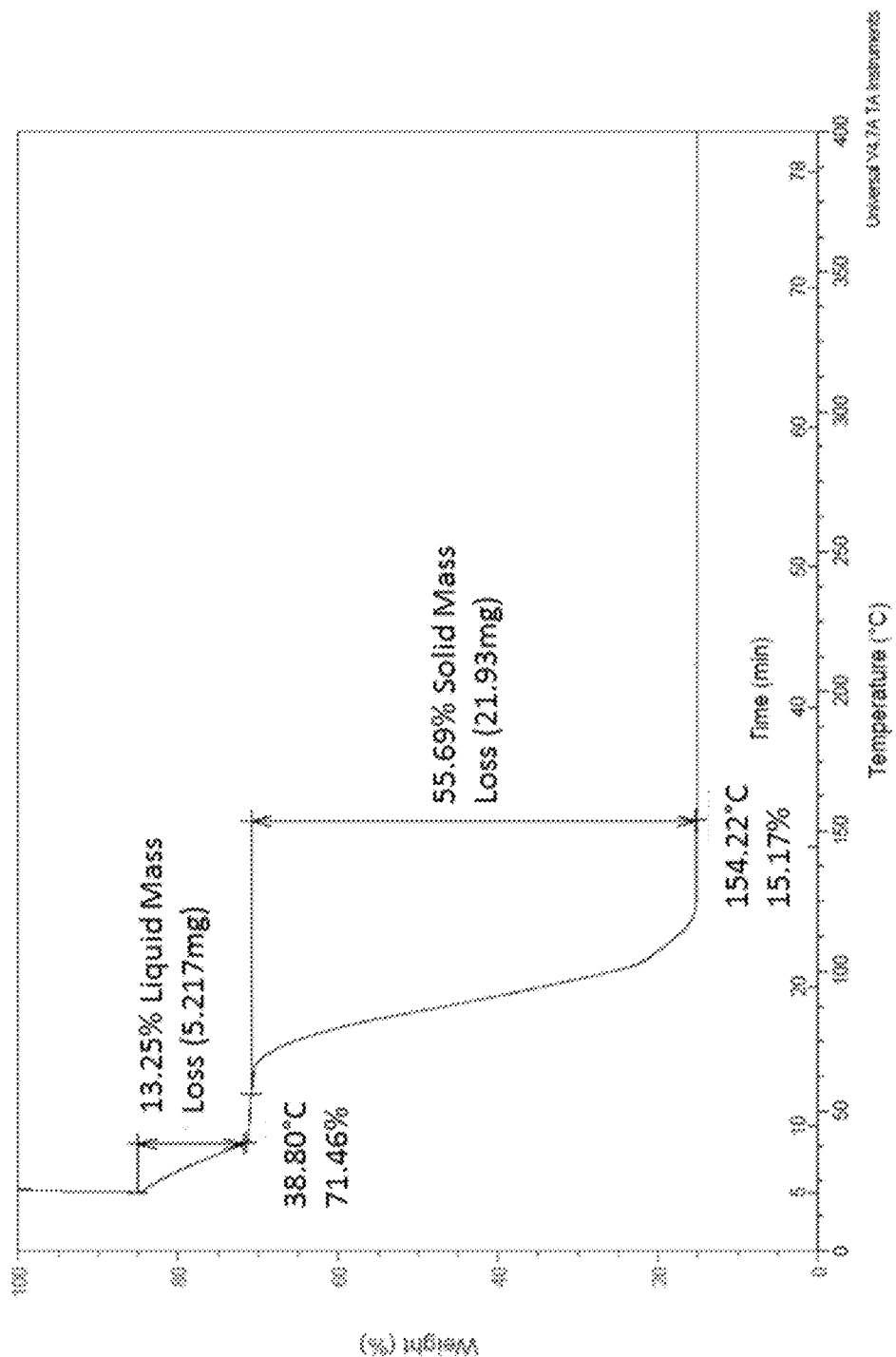
FIG. 7A is a graph illustrating drying of antiperovskite according to embodiments of the present invention.

FIG. 7A is a graph illustrating thermogravimetric analysis drying of antiperovskite precursor as a precursor solution according to embodiments of the present invention. This diagram is merely an example, which should not unduly limit the scope of the claims. One of ordinary skill in the art would recognize many variations, alternatives, and modifications. For example, a solution containing LiOH and LiCl materials are dried at the temperatures indicated in the graph. A solution containing 1M LiOH and 0.5M LiCl in a solvent of 1:1 ratio Methanol:Water is dried to less than 20% of its starting weight, which indicates that non-solid contents are substantially removed.

Figure 7B:
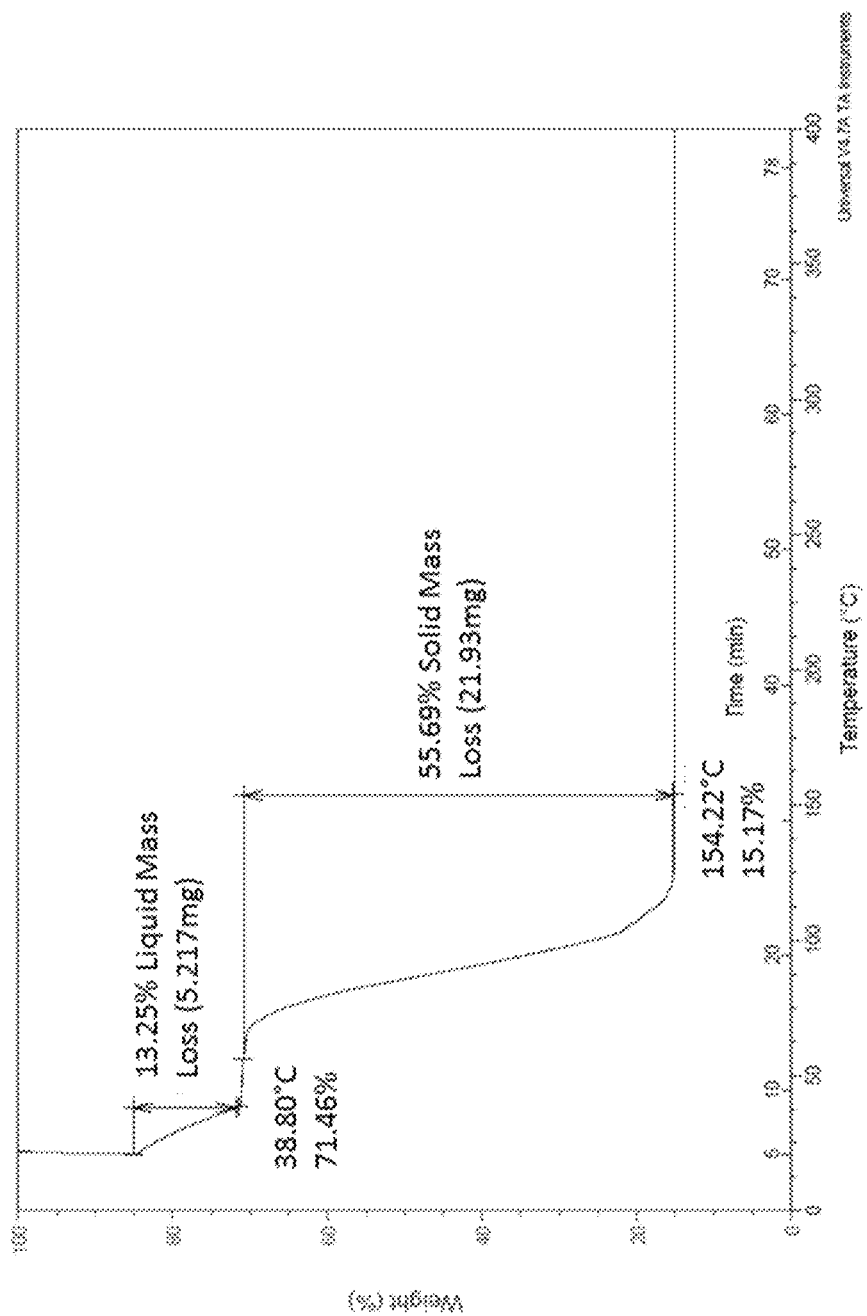
FIG. 7B is DSC graph illustrating heat applied at various times of the processes described above.

FIG. 7B is DSC graph illustrating heat applied at various times of the TGA processes described above. For example, 1M LiOH and 0.5M LiCl precursor is used in a solution of 1:1 Methanol:Water solvent.

In addition to using doctor blades, spray fabrication processes can be used for manufacturing Li3OCl material according to embodiments of the present invention.

Example 1: Spray Fabrication of Li3OCl

Figure 8:
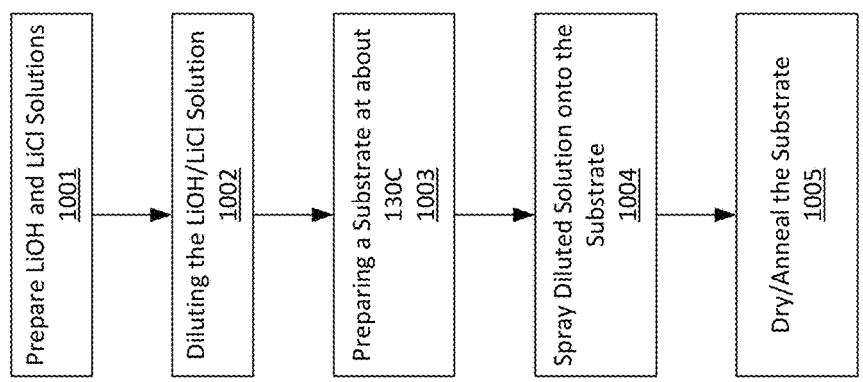
FIG. 8 is a simplified flow diagram illustrating a method for forming a thin film of Li3OCl material according to an embodiment of the invention.

FIG. 8 is a simplified flow diagram illustrating a method for forming a thin film of Li3OCl material according to an embodiment of the invention. This diagram is merely an example, which should not unduly limit the scope of the claims. One of ordinary skill in the art would recognize many variations, alternatives, and modifications.

At step 1001, a solution of lithium hydroxide (LiOH) in H2O at a concentration of 50-500 mM (millimoles) is mixed with a solution of lithium chloride (LiCl) 50-500 mM dissolved in water. For example, optimal concentrations can be determined based on the spraying equipment to obtain a smooth (i.e., <1 μm roughness) film. The ratios of the LiOH:LiCl depend on the desired final film stoichiometry. For example, to obtain a $Li_3OCl$ film, approximately 2:1 LiOH:LiCl by mole is mixed.

At step 1002, the mixed solution is diluted. The mixed solution can be diluted. In an embodiment, the solution of LiOH and LiCl is diluted to for a resulting solution 2×-5× with ethanol. Among other things, ethanol is used to decrease droplet size and improve film morphology of the sprayed on film during the spray fabrication processes. For example, the amount of dilution needed depends on the spraying nozzle and more dilution will prevent clogging.

At step 1003, a substrate is prepared. A substrate (e.g., aluminum material) is heated to about 130 degrees C. The substrate may be a negative electrode, negative current collector, positive electrode, positive current collector, or a carrier substrate for one of the above. For example, the top layer of the substrate may be characterized by a high degree of wetability by the solution, and the roughness can be less than the desired final film thickness.

At step 1004, the diluted solution is sprayed onto the substrate. In a specific embodiment, a spray process is performed at about 1-2 mL/min such that as either the substrate or nozzle moves relative to the other, a smooth film of the diluted material is deposited on to the substrate surface.

At step 1005, the substrate and the deposited thin film is dried and annealed. In various embodiments, after deposition, the material is heated to between 220-300° C. It is to be appreciated that other temperatures are possible as well. For example, the range of product stoichiometry can be about $(Li_xH_{1-x})O_yCl_z$ with x preferably above 0.5 and more preferably above 0.9, y above 0.8, and z above 0.8.

It is to be appreciated that other types of antiperovskite material can be formed using spray fabrication method described above:

Example: Spray Fabrication of Li$_3$OF

Solution of LiOH in H2O 50-500 mM, mixed with NH$_4$HF$_2$ 50-500 mM dissolved in H$_2$O at ⅓ by mol
Dilute resulting solution 2×-5× with Ethanol
Heated substrate to 130° C.
Spray at about 1-2 mL/min
After deposition, heat to between 220-300° C. The range of product stoichiometry is $(Li_xH_{1-x})O_yF_z$ with x preferably above 0.5 and more preferably above 0.9, y above 0.8, and z above 0.8.

Example: Spray Fabrication of Li$_3$SCl

Solution of LiCl in H2O 50-500 mM, mixed with CS(NH$_2$)$_2$ 50-500 mM dissolved in Ethanol at ⅔ by mol
Dilute resulting solution 2×-5× with Ethanol
Heated substrate to 130° C.
Spray at about 1-2 mL/min
After deposition, heat to between 220-300° C. The range of product stoichiometry is $(Li_xH_{1-x})S_yCl_z$ with x preferably above 0.5 and more preferably above 0.9, y above 0.8, and z above 0.8.

Example: Spray Fabrication of Li$_3$SF

Solution of LiNO$_3$ in H2O 50-500 mM, mixed with CS(NH$_2$)$_2$ 50-500 mM dissolved in Ethanol at ⅔ by mol, NH$_4$HF$_2$ 50-500 mM dissolved in H$_2$O at ⅓ by mol.
Dilute resulting solution 2×-5× with Ethanol
Heated substrate to 130° C.
Spray at about 1-2 mL/min
After deposition, heat to between 220-300° C. The range of product stoichiometry is $(Li_xH_{1-x})S_yF_z$ with x preferably above 0.5 and more preferably above 0.9, y above 0.8, and z above 0.8.

It is to be appreciated that other techniques can be used to produce films containing. For example, one such processes involves initially creating a matrix film followed by a thermal anneal in a sulfurizing environment such as one with an elemental S presence or else in an H$_2$S environment. An exemplary process to do this is to put the sample to be sulfurized in a furnace with a gas inlet. The furnace temperature would be determined by a number of factors such as: insertion kinetics, substrate compatibility, and processing time. The temperature would typically be in the range of 200-500° C. In an embodiment, an elemental sulfur presence can be accomplished by preheating a bubbler containing elemental 5 to 130-150° C. Inert gas such as Ar or N$_2$ may flow through the bubbler to the furnace through the gas inlet. The piping between the bubble and furnace needs to be heated to prevent S condensation during transport. The temperature of the piping is typically 10-20° C. higher than the bubbler temperature. The sample would be exposed in this environment for 20-180 mins.

An H$_2$S environment could be accomplished by flowing H$_2$S gas directly to the furnace. Typically pure H$_2$S gas is not required. Rather 5-14% H$_2$S in balance Ar or N$_2$ is sufficient for sulfurization. Additionally, a three component mixture of 5-14% H$_2$S, 5-15% H$_2$, balance Ar or N$_2$ may improve sulfurization kinetics due to the presence of the reducing H$_2$. The sample is exposed to this environment for 5-45 minutes.

Example: Spray Fabrication of Li$_3$SCl Example Via Sulfurization

Solution of LiCl in H2O 50-500 mM. The concentration is selected such that the sprayed on LiCl matrix film is smooth and dense.
Dilute resulting solution 2×-5× with Ethanol
Heated substrate to 130° C.
Spray at about 1-2 mL/min
After deposition, heat to between 220-300° C. in a tube furnace. Expose the LiCl matrix to an elemental S environment using a bubbler for 30 minutes or until the desired composition is obtained. The range of product stoichiometry is $(Li_xH_{1-x})S_yCl_z$ with x preferably above 0.5 and more preferably above 0.9, y above 0.8, and z above 0.8.

Example: Doctor Blade Fabrication of Li$_3$SCl Example Via Sulfurization

Solution of LiCl in H$_2$O 1-2 M
Dilute resulting solution with equal volume of Methanol
Heated substrate to 60° C.
Doctor blade a 10 micron film
After deposition, heat to between 220-300° C. in a tube furnace. Expose the LiCl matrix to an H$_2$S/H$_2$/Ar mixture for 30 minutes or until the desired composition is obtained. The range of product stoichiometry is $(Li_xH_{1-x})S_yCl_z$ with x preferably above 0.5 and more preferably above 0.9, y above 0.8, and z above 0.8.

Example: Spray Fabrication of Li$_3$SF by Sulfurization

Solution of LiF in H$_2$O 50-500 mM
Dilute resulting solution 2×-5× with Ethanol
Heated substrate to 130° C.
Spray at about 1-2 mL/min
After deposition, heat to between 220-300° C. After deposition, heat to between 220-300° C. in a tube furnace. Expose the LiCl matrix to an elemental S environment using a bubbler for 30 minutes or until the desired composition is obtained. The range of product stoichiometry is $(Li_xH_{1-x})S_yCl_z$ with x preferably above 0.5 and more preferably above 0.9, y above 0.8, and z above 0.8. A few examples of solution based fabrication processes will now be presented.

In addition to solution based processes, antiperovskite material can also be formed using other processes, as described below.

It is to be appreciated that wet synthesis methods as described above have certain advantages where thin films can be prepared from solutions using a range of techniques such as doctor blading, slot-die, spin-coating and spray deposition. Usually, removal of the residual water requires a vacuum bake for several days adding time and expense to the process. The issue of water contamination in the antiperovskites can be avoided by synthesis in entirely organic solvents. Chloride and oxychloride precursors such as lithium chloride and lithium perchlorate, which are soluble in anhydrous organic solvents such as tetrahydrofuran, can be used. In addition a strong lithiating agent such as metallic lithium or butyl lithium can be used to achieve the correct lithium stoichiometry. For example, reactions are conducted in Lithium supporting solvents such as Alkanes, and/or ethereal solvents such as THF, Diethyl-ether, Dimethoxyethane (DME) or Dioxane.

In an exemplary embodiment, a 44 mls of Tetrahydrofuran (THF) in an ice-bath at 0° C. is added to 0.2776 gms of lithium metal granules. After stirring for a few minute, 15 mls of about 1.0 M LiCl solution in THF is added dropwise. Following further stirring 5 mls of a 1.0M $LiClO_4$ solution, THF is added and the mixture is stirred for about an hour. The resulting product can be recovered by centrifuging and drying under Argon. Residual organic species in the resulting precursor powder can be removed by annealing in dry air or Argon or Nitrogen.

In a specific embodiment, about 4.239 gms of LiCl and 4.79 gms of LiOH is added to a 100 mls solution of a 50:50 $H_2O$:Ethanol. The mixture is placed in a Teflon lined Hydrothermal Bomb and sealed. The bomb is slowly heated to 250 C and held for 10 hrs. The vessel is then cooled to room temperature and the resulting product is recovered by centrifuging and washing in excess Methanol. The final powder is dried at 200 C under vacuum.

In certain embodiments, antiperovskite material is synthesized by solid state reaction. For example, $Li_3OCl$ antiperovskites can be synthesized by solid state reaction between lithium salts such as LiCl, $Li_2CO_3$, LiOH, $Li_2O$, $LiNO_3$ and/or Lithium metal. Salts and/or metals are combined in the appropriate ratio by dry mixing or ball milling in an inert solvent such as THF, Diethylether. The dried powder are loaded into a hot isostatic press and heated to temperatures between 700-1200 C.

Figure 9:
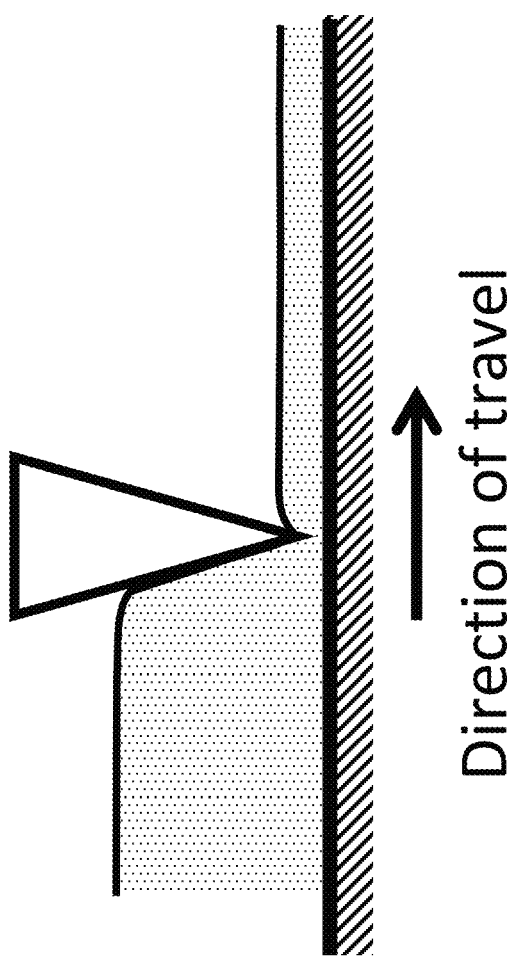
FIG. 9 is a simplified diagram illustrating applying antiperovskite material to a substrate.
Figure 10:
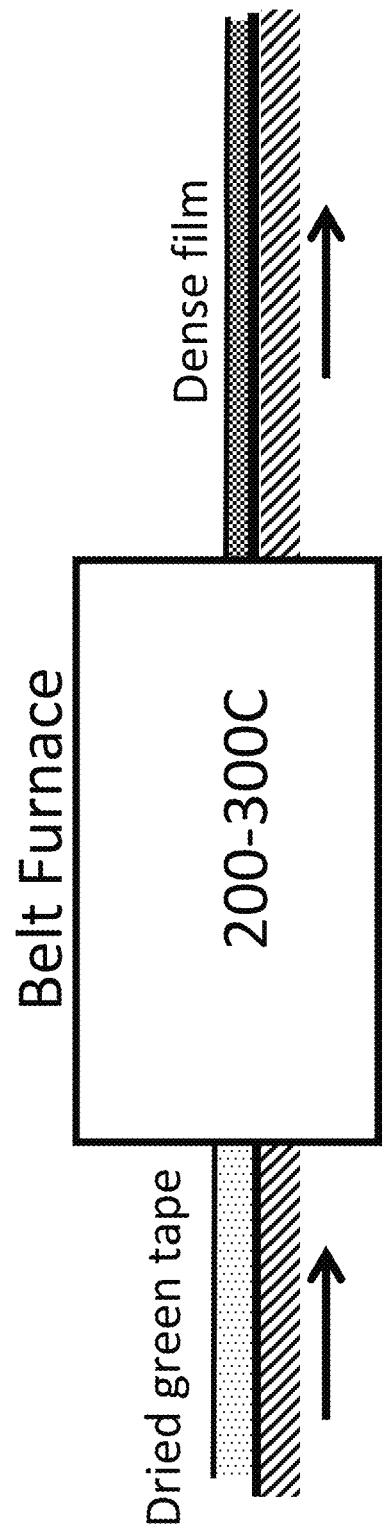
FIG. 10 is a simplified diagram illustrating heating a substrate having a film of antiperovskite material.

In various embodiments, thick films of material is synthesized from pre-synthesized antiperovskite powders Pre-synthesized antiperovskite powders can prepared by any of the aforementioned methods can be formed into thick films by a doctor blading method. The powders is first formed into a castable slurry by mixing with an appropriate solvent binder system. The slurry is then coated onto a carrier substrate by a doctor blade process shown in FIG. 9 to form an unfired "green" tape. The substrate may also serve as the current collector. For example, the substrate can be copper foil, aluminum foil, or other types of material. The green tape is dried and then passed through a belt furnace where, at sufficiently high temperatures, the antiperovskite powders sinter to form a dense film with low porosity, as shown in FIG. 10.

As an example, about 30 grams of pre-synthesized antiperovskite powder are added to 100 ml of a toluene:ethanol (4:1) solvent mixture and ball-milled in a Teflon lined vessel using yttria-stabilized zirconia milling media for 24 hrs. Subsequently 10 grams of a binder, polyvinyl-butryl (PVB) is added slowly to the mixture and the vessel is returned to the ball-mill for a further 24 hrs. The milled slurry is cast on a moving copper carrier film using a doctor blade to achieve a wet film thickness of 15 microns. The solvent is evaporated under a flowing dry air stream and the green tape on the copper foil is then passed through a belt furnace under an argon rich atmosphere at a temperature of 270 C. The dwell time of the film within the furnace is 10-20 minutes. The sintered film emerges from the belt furnace and has a final fired thickness on the order of 5 microns.

In various embodiments, antiperovskite material is doped with aluminum material, and the aluminum doped material is used as solid state electrolyte material of electrochemical devices. Among other things, doped antiperovskite material can provide a high level of ionic conductivity that is desirable for thin-film battery electrolyte material. In particular, $Li_aAl_bO_cCl_dBr_eH_f$, a type of aluminum-doped antiperovskite material is a fast ion conducting electrolyte with good electrical resistivity. As described herein, embodiments of the present invention provide a method to form (and/or deposit) $Li_aAl_bO_cCl_dBr_eH_f$ material from inexpensive precursors with using an inexpensive and scalable manufacturing process. In an embodiment, the antiperovskite is deposited as $Li_aAl_bO_cCl_dI_eH_f$ from inexpensive precursors. For example, precursor materials are dissolved in methanol and water and deposited by slot die, gravure, spray, meyer rod, and/or other industrial coating processes onto a substrate. The $Li_aAl_bO_cCl_dBr_eH_f$ material can be formed as a thin film with a thickness of less 5 um can, with high quality, uniformity, and low pinhole/defect count. It is to be appreciated that aluminum doped antiperovskite material can have many advantages, including high lithium ion conductivity, high electrical resistivity, and high processability as thin films. These characteristics addresses the drawbacks of other solid state electrolytes, such as limited recharge time, limited power density, limited capacity, and low energy density. For example, typical $Li_3OCl$ material is characterized by low conductivity and limited reproducibility due to difficulty of processing. As another example, LiOCl-hydrate type of materials is characterized by low ionic conductivity and high-level of proton conductivity as opposed to lithium conductivity. Similarly, most crystalline oxides are characterized by low conductivity, making them unsuitable for solid electrolyte material. Many sulfides & oxides: highly conductive, but cannot be processed into thin films, resulting in lower energy density.

Antiperovskite with Aluminum Doping

It is to be appreciated that for applications involving antiperovskite serving as electrolyte in electrochemical devices, it is often desirable for the antiperovskite material to have good ionic conductivity. In various embodiments described below, a desirable level of ionic conductivity is achieved with a predetermined range of aluminum doping into the antiperosvkite material. In a specific embodiment, antiperovskite material is described by the formula $Li_aAl_bO_cCl_dBr_eH_f$, which is shown to be a fast ion conducting electrolyte with good electrical resistivity. Embodiments of the present invention provide methods to deposit it using inexpensive precursor materials, and the method can be an inexpensive and scalable process. For example, the precursor chemicals are dissolved in methanol and water and deposited by slot die, gravure, spray, meyer rod, and/or other coating processes. In various embodiments, the antipervoskite material can have a thickness of less than 5 um and characterized with a high level of quality, uniformity, and a low pinhole/defect count. The aluminum doped antiperovskite material processed according to embodiments of the present invention is characterized by a high level of ionic conductivity and a high level of electrical resistivity. These characteristics, when the antiperovskite material is used for solid state electrolyte applications in a secondary battery device, contribute to good performance in recharge time, power density, capacity, and energy density.

As explained above, it is desirable for solid electrolyte material to have high ionic conductivity and high electrical resistivity. Unfortunately, $Li_3OCl$ material typically has relatively low conductivity and is difficult to manufacture. LiOCl hydrates similarly has low ionic (or lithium) conductivity, but has a high level of proton conductivity. Most crystalline oxides are characterized by a low level of ionic conductivity as well. While many sulfides and oxides have a high level of ionic conductivity, they are often difficult to process into thin films.

According to various embodiments, a process of preparing aluminum doped antiperovskite material comprises the following steps:
1. Solution preparation;
2. Substrate preparation;
3. Deposition & drying; and
4. Thermal processing The doped antiperovskite material prepared according to embodiments of the present invention can have an optimal concentration of aluminum material, which in certain implementation is about 10-1000 ppm. It is to be appreciated that while the aluminum material improves performance of antiperovskite material as a solid electrolyte, too much aluminum may result in shorting the battery device.

Figure 11:
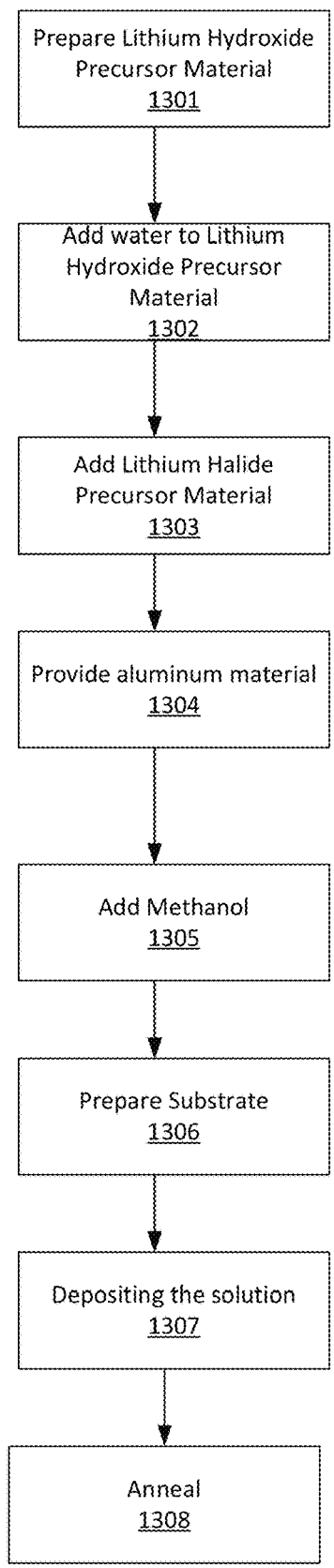
FIG. 11 is a simplified flow chart illustrating a process that produces a thin film of doped antiperovskite material according to embodiments of the present invention.

FIG. 11 is a simplified diagram illustrating a doctor blade process that produces a thin film of dope antiperovskite material according to embodiments of the present invention. This diagram is merely an example, which should not unduly limit the scope of the claims. One of ordinary skill in the art would recognize many variations, alternatives, and modifications. For example, various steps may be added, removed, repeated, rearranged, replaced, modified, and/or overlapped.

At step 1301, lithium hydroxide precursor material is prepared. In a specific embodiment, the lithium hydroxide material is characterized by a concentration of about 1M. Depending on the application, other concentration levels are possible as well and can range from about 0.01M to 2M. Lithium hydroxide is soluble in selected types of solvents. For example, water, methanol, and ethanol represent some solvents in which lithium hydroxide is soluble. Depending on the implementation, the lithium hydroxide material can be in a solid form, and grinding of solid lithium hydroxide can be performed to improve ease of dissolution.

Water is added to the lithium hydroxide material at step 1302. Among other things, water is a part of the solvent system in the process, and methanol is used in conjunction with water and added later.

At step 1303, lithium halide is added. Depending on the implementation, halide can be chloride and/or bromide material. It is to be appreciated that Lithium bromide substitution for lithium chloride has been tested and has shown to improve ionic conductivity performance as well as reducing the activation energy. As an example, lithium halide can have a concentration of about 0.5M. In certain embodiments, a 2:1 ratio between the lithium hydroxide and the lithium halide is chosen based on empirical data to maximize ionic conductivity. Stoichiometrically, ratios of about 2:1, 1:1, and 4:3 for the LiOH:LiX can be used. Depending on the application, the lithium halide material can also have a concentration range from about 1M to 2M in solution. In various embodiments, ratios of LiOH:LiCl or LiOH:LiBr can be altered to achieve different material composition and structure. For doctor blade application, an approximately 2:1 ratio of LiOH to LiCl (or LiBr or mixture of LiCl/LiBr) can provide desirable results. For example, at a range from about 0.4:1 ratio to about 4:1 ratio of LiOH to LiCl can be shown to provide good ionic conductivity.

At step 1304, aluminum material is added. Depending on the specific implementation, aluminum material can be added in various ways. For example, an aluminum material source can be provided using aluminum chloride material that is dissolved in water (e.g., $AlCl_3$ in $6H_2O$). It is to be appreciated that aluminum material can be added in other ways well. For example, aluminum material can be used as a substrate or coating thereof, which contributes aluminum to the reaction with the LiOH and LiCl (or LiBr or LiI). In various embodiments, aluminum oxide nanoparticles and aluminum chloride hexahydrate are used as aluminum source compounds for aluminum doping.

At step 1306, methanol, as a solvent, is added. As explained above, methanol is used to dissolve lithium hydroxide material, as lithium hydroxide is soluble in few solvents. Water, methanol, and ethanol are some solvents in which lithium hydroxide is soluble. For example, methanol used to lower surface tension of the fluid. This will improve wettability. Methanol is also used to minimize the amount of water. It is to be appreciated that the less water used in the solution, the less water needs to be removed from the system later steps.

Lithium chloride and lithium bromide are soluble in more solvents than lithium hydroxide. For solubility purposes and coatability reasons, an exemplary formulation uses a 50%:50% blend of methanol and water according to an embodiment of the invention. The ratio can be adjusted depending on wetting behavior desired and drying rate desired. For example, desired amount of lithium hydroxide is measured to make 1M final concentration for the primary formulation, but can be adjusted as necessary. Range of concentration can be around 1M to 2M. For mixing, the solution can be stirred and shaken until dissolved. In certain embodiments, 50 C heat can be used to assist dissolution.

Substrate is prepared at step 1306. For example, the substrate is prepared. For example, the substrate is prepared in parallel to solution preparation. In various embodiments, preparation of substrate involves cleaning of the surface to allow for a uniform deposition and coating of the substrate surface. Also, surface preparation is needed to provide coatability and adhesion. In certain embodiments, functionalization of the material is necessary to initiate the proper reaction.

In a specific embodiment, aluminum is used the coating substrate. Wiping the surface of the aluminum with IPA will remove the residual organics on the surface. In certain implementations, atmospheric plasma is used to further clean the material as well as to functionalize or treat the surface of the substrate effectively. Upon preparation, the top layer of the substrate should have good wettability by the solution, and the roughness should be less than the desired final film thickness. Wettability can be measured by low contact angle when a drop of solution is placed on the surface of the substrate. Wettability can also be characterized with surface energy. High surface energy indicates better wettability. A quick test of wettability is to test hydrophilic/hydrophobic nature of the surface. Better surfaces show better hydrophilic properties.

As explained above, aluminum material can be used both as an substrate and a material source. In a specific embodiment, the aluminum substrates contributes to the antiperovskite material at a concentration of about 10-1000 ppm.

At step 1307, the solution containing lithium halide, lithium hydroxide, aluminum material, water, and methanol is deposited. In various embodiments, the deposition process involves a blanket coating of the solution on the desired substrate. Blanket coating methods include doctor blade application, slot die coating, spin coating, roll coating, and/or other methods. Printing methods such as inkjet printing, flexoprinting, and screen printing can also be used as a deposition method. A wet film of with a thickness of about 30 um results in a final (dry) film thickness of about 5 um. In a specific embodiment, deposition takes place on a heated substrate for doctor blade application in atmosphere ambient. For example, a process of record has the substrate temperature set at to about 50 C while the solution is applied.

The deposited solution is dried. For example, a temperature of about 50 C is provided for drying the solution. In a specific embodiment, the substrate is held at a temperature of about 50 degrees Celsius, which facilitates the evaporation of methanol and water. In certain embodiment, the surface flow rate is at about 100 cfm during the drying process. Depending on the implementation, the drying process can take about 2 to 10 minutes. Other durations are possible as well. It is to be appreciated that drying rate, uniformity, and mechanism are to be controlled to prevent and/or limit pinhole formation and non-uniform drying patterns. Optimal drying conditions may vary depending on the solvent system used.

At step 1308, the antiperovskite material is annealed. A thermal anneal step is provided to initiate the reaction between LiOH and LiCl (or LiBr or LiI). As an example, this can be achieved at a number of different temperatures, depending on the equipment used for the process. In a specific embodiment, a hot plate at 330 C is used for 180 minutes soak time at the temperature. It is to be appreciated that good performance can be achieved in a vacuum oven managed environment atmosphere to remove residual water and hydrates. Other duration and temperature can be used as well, as the annealing process can have a wide range. For example, annealing parameters of about 180 C-400 C with times of about 45 minutes to 3 days can be used on different equipment platforms. In an embodiment, the anneal process is performed in an Argon ambient.

It is to be appreciated that the process illustrated in FIG. 11 can have other various. For example, for the halide material, LiBr can be used to substitute LiCl. Since bromide has a larger ionic radius than chloride, it can expand the lattice and provide for better ionic conductivity. In an implementation, LiBr is used as a substitution of the lithium halide salt while keeping other aspects of processing conditions the same, and improvement of the ionic conductivity performance can be observed. In addition to improvement in ionic conductivity, an improvement in activation energy can also be observed. For LiBr based chemistry, temperature has less of an impact on the ionic conductivity performance. Similarly, LiI is used as the lithium halide salt and provides a higher conductivity and a lower activation energy, both are desirable properties.

It is to be appreciated that the use of aluminum material improves antiperovskite performance in solid electrolyte applications. In various implementations, aluminum substrate is used as a source of aluminum doping for the thin film electrolyte material. It is to be appreciated that having a consistent surface is important to maintaining the right amount of aluminum doping in the material. For example, a concentration of about 10 ppm of aluminum material can improve ionic conductivity of doped antiperovskite material. However, too much aluminum material with the antiperovskite can leads to shorting of the device when the doped antiperovskite material is used as a solid electrolyte material. For different films processed in the same way, a variability in ionic conductivity performance can be observed. For example, when XPS and SIMS are conducted on the bulk sample, a correlation between aluminum intensity and ionic conductivity performance is observed, which is explained below. It is to be understood that aluminum doping control is important to achieve desired ionic conductivity performance. Changes in aluminum concentration in the material has an effect on the ionic conductivity performance as well as the material quality (yield and electronic leakage).

Figure 12:
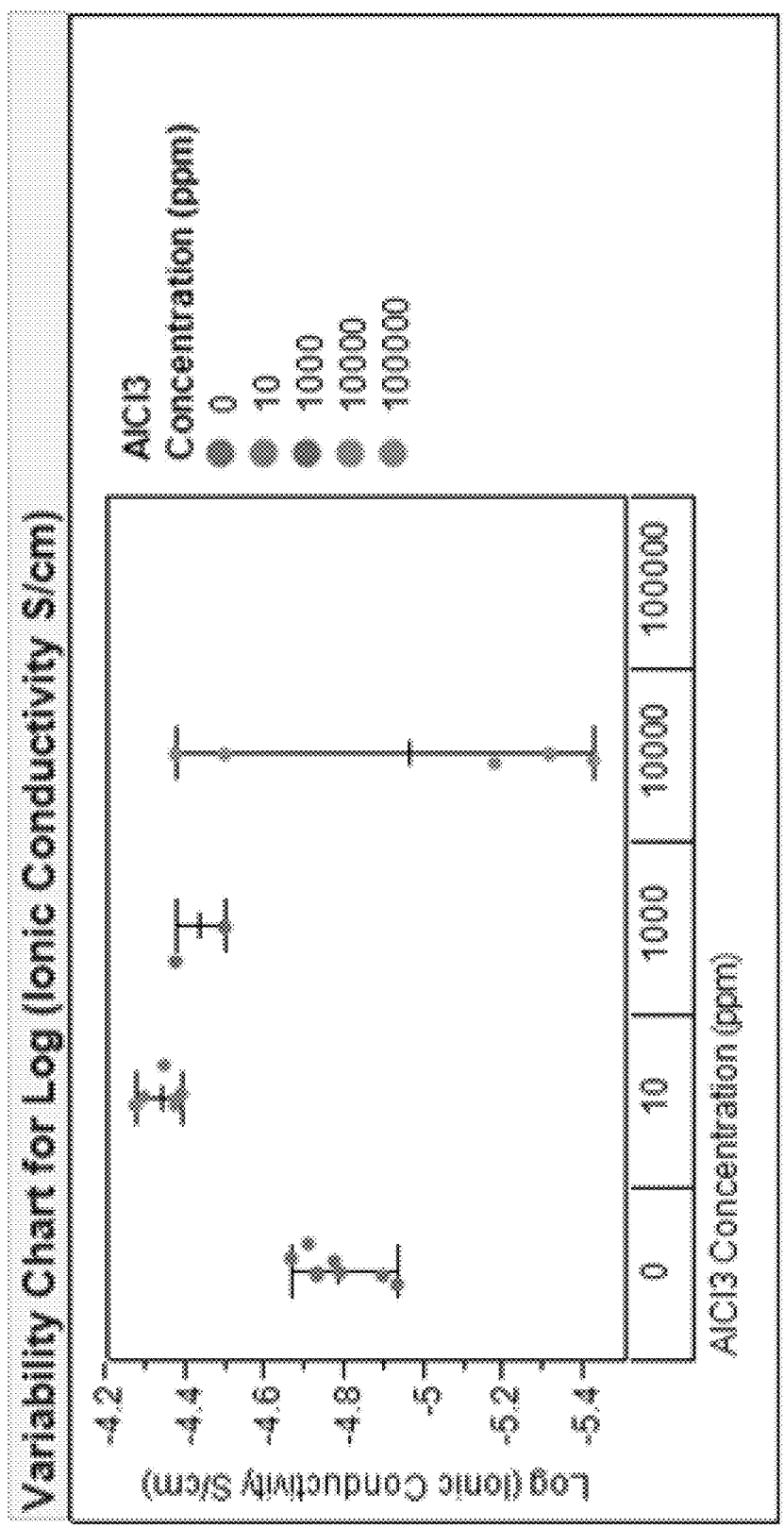
FIG. 12 is a simplified diagram illustrating a relationship between ionic conductivity and aluminum doping concentration according to an embodiment of the present invention.

FIG. 12 is a simplified diagram illustrating a relationship between ionic conductivity and aluminum doping concentration according to an embodiment of the present invention. This diagram is merely an example, which should not unduly limit the scope of the claims. One of ordinary skill in the art would recognize many variations, alternatives, and modifications. In a specific implementation, $AlCl_3$ material and $H_2O$ are provided to doped the antiperovskite precursors material on aluminum substrate. At a concentration of 10 ppm, the $AlCl_3$ doping can help achieve a high level of ionic conductivity and a low level of variability. It is to be appreciated that when the processes is performed on stainless steel substrate (e.g., stainless steel 430, 304, etc.), a similar amount of $AlCl_3$ doping can be used.

It is to be understood that change in $AlCl_3$ doping concentration results in change in yield and performance for APH on Al. $AlCl_3$ doping of APH material on smooth stainless steel typically results in non-shorted devices. Increasing concentration of $AlCl_3$ can result in non-shorted and ionically conductive devices. For example, 5000 ppm of $AlCl_3$ results in ionic conductors. It is to be understood that other concentration of $AlCl_3$ are possible as well, but it is important that the high concentration of $AlCl_3$ does not cause shorting of the electrolyte.

As explained above, aluminum doped antiperovskite material can be processed using different types of materials. For example, while chloride and/or bromide material can be used as the lithium halide precursor material, lithium iodide (with formula "LiI") can be used as a halide as well. It is to be appreciated that by using lithium iodide as a halide precursor during the formation of the aluminum doped antiperovskite material, high performance in ionic conductivity can be achieved.

Figure 13:
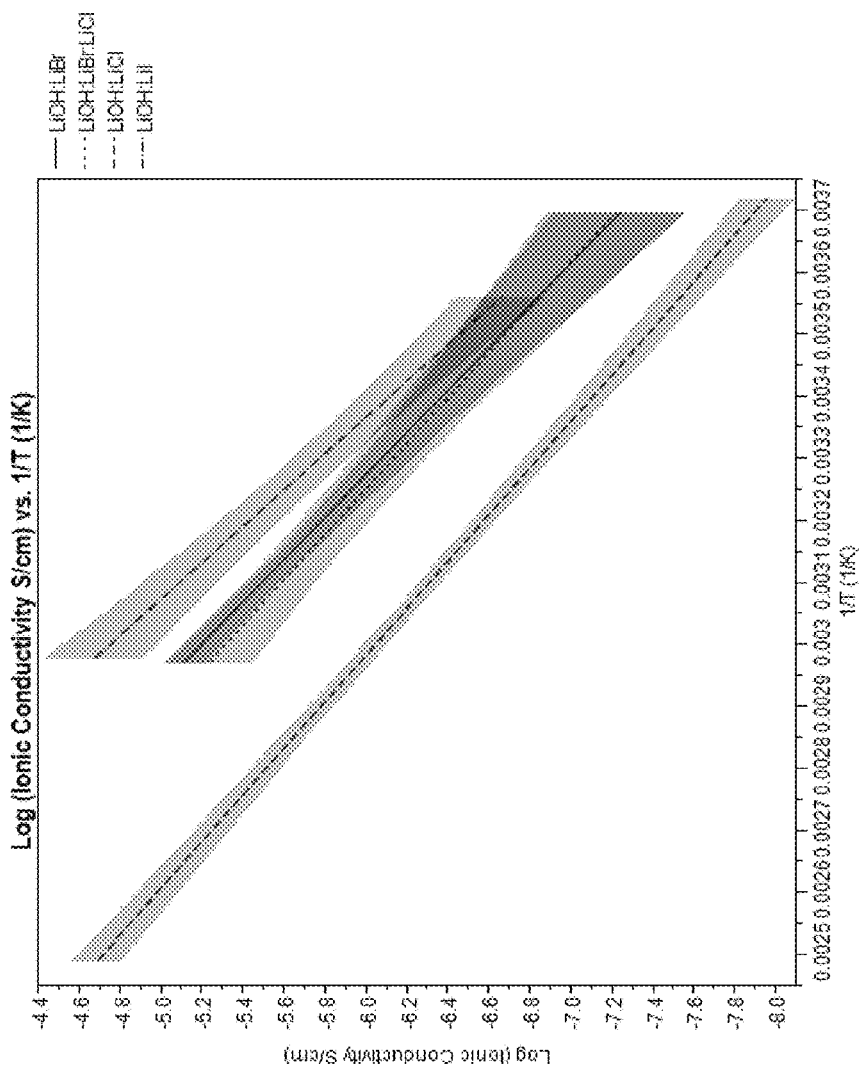
FIG. 13 is a plot of ionic conductivity versus temperature for different X in $Li_3OX$ (X=Br, Cl, Cl:Br, and I).

FIG. 13 is a simplified diagram illustrating ionic conductivity of various types of doped antiperovskite materials according to embodiments of the present invention. The data shows that LiI as the lithium halide has the highest conductivity, followed by LiBr and LiBr+LiCl, followed by LiCl. This diagram is merely an example, which should not unduly limit the scope of the claims. One of ordinary skill in the art would recognize many variations, alternatives, and modifications. As shown in FIG. 13, antiperovskite material manufactured from lithium iodide precursor material exhibits a high level of ionic conductivity, a desirable characteristic for electrolyte material.

It is to be appreciated that antiperovskite materials can have different configurations, and different processes can be used for manufacturing antiperosvkite materials that can be used as electrolytes. More specifically, when a solid electrolyte is used in a battery cell, it provides an ionically conductive medium without consuming significant amounts of active material such as lithium ions in the formation of SEI (solid electrolyte interface) layers. In generally, solid electrolytes are safer than many liquid electrolytes. If a cell containing a liquid electrolyte has a temperature increase from a short circuit, overcharge or other event, oxygen may evolve from the cathode, and an explosion may result from the rapid expansion into the gas phase. When a solid electrolyte is employed, it does not provide fuel for such explosion in the event of a short circuit, etc.

In some examples, the antiperovskite electrolyte material can have a relatively high lithium ionconductivity, e.g., at least about $10^{-6}$ Siemens per centimeter or at least about $10^{-3}$ Siemens per centimeter.

In one version the solid state electrolyte has a lithium ion conductivity of greater than $10^{-7}$ S/cm at 100 degrees Celsius. Preferably, the material has an ion conductivity of at least $10^{-5}$ S/cm, and even more preferably the material has an ion conductivity of greater than $10^{-4}$ S/cm at 100 degrees celsius. In one version the solid state electrolyte has an electronic conductivity of less than $10^{-10}$ S/cm at 100 degrees celsius.

As explained above, the properties of a good solid electrolyte material include high ionic conductivity for lithium, magnesium, and/or any other desired ionic charge carrier flowing through the electrolyte, low electronic conductivity, and chemical and electrical stability under the conditions encountered in the cell. A good electrolyte for lithium batteries has a high ionic conductivity for lithium ions and a much lower ionic conductivity for all other species so that the transference number of lithium approaches unity. Additionally, a good electrolyte for batteries employing lithium metal anodes should also have sufficient density to resist formation of lithium dendrites. Another property that may be important is the cost of the material, which is a function of the manufacturing processes employed to form the material. A material that can be produced by a solution phase process is likely to be inherently less expensive than one produced by physical vapor deposition or chemical vapor deposition process. It is to be appreciated that antiperovskite materials according to embodiments of the present invention can provide the desired characteristics.

In certain embodiments, a solid electrolyte of the structures described herein has an electronic resistivity of at least about $10^9$ Ω-cm. In some examples, a solid electrolyte of any of the structures described herein has an electronic resistivity of at least about $10^{10}$ Ω-cm, or at least about $10^{11}$ Ω-cm, or at least about $10^{12}$ Ω-cm. In certain embodiments, a solid electrolyte of any of the structures described herein has a lithium ion conductivity, $\sigma_i$, that is at least about $10^7$ times greater than its electronic conductivity, $\sigma_e$.

As described above, there are various types of antiperovskite materials. In certain embodiments, the electrolyte material comprises a variant of an antiperovskite compound of the formula $Li_3OX$, where X is a halide such as fluoride, chloride, iodide, or bromide. The variants may include oxygen or other anion vacancies, substitutions of oxygen atoms for halogen atoms, or other variations that reduce the concentration of negative valence in the composition.

There are various alternatives to the $Li_3OX$ base compositions according to embodiments of the present invention. One such alternative includes antiperovskite base compositions in which oxygen is replaced by sulfur such that the composition has the formula $Li_3SX$. Oxygen may also be replaced with selenium or tellurium. In another example, a magnesium containing anti-perovskite is used as the base composition. Such compositions have the formula $Mg_3AB$, where the valences of A and B sum to −6. In one case, A has a valence of −2 and B has a valence of −4 (e.g., O and C). In another case, A and B both have valences of −3 (e.g., N and P or N and Sb or N and As). A fraction of A may be replaced with A vacancies or aliovalent doping where the dopant atom(s) has a more positive valence than A. Such compositions may be employed in magnesium ion conducting batteries. In another example, an anti-fluorite lattice structure having the formula $Li_2O$ or $Li_2S$ is used as the base composition. In another example, the base composition has an anti-pyrochlore crystal structure with the formula $A_2B_2Li_7$, where A has a −3 valence and B has a −4 valence. In some cases, the anti-pyrochlore compound has the formula $AA'B_2Li_7$, where A has a valence of −1 (e.g., a halide) and A' has a valence of −2 (e.g., O, S, Se, or Te) and B also has a valence of −2. Alternatively, the anti-pyrochlore compound has the formula $A_2BB'Li_7$, where A has a valence of −1 (e.g., a halide) and B has a valence of −2 (e.g., O, S, Se, Te) and B' has a valence of −3 (e.g., N, P, As, or Sb). In another example, the base composition has an anti-δ $Bi_2O_3$ crystal structure with the formula $A_2Li_3$, such as $AA'Li_3$, where A has a valence of −1 (e.g., a halide) and A' has a valence of −2 (e.g., O, S, Se, or Te). In yet another example, the base composition has an anti-brownmillerite crystal structure with the formula $A_2B_2Li_5$ such as $A_2BB'Li_5$, where A has a valence of −1 (e.g., a halide), B has a valence of −2 (e.g., O, S, Se, and Te) and B' has a valence of −1 (e.g., a halide). In still another example, the base composition is a compound having an anti-$K_2MgF_4$ crystal structure with the formula $A_2BLi_4$, where A has a valence of −1 (e.g., F, Cl, Br, I) and B has a valence of −2 (e.g., O, S, Se, Te).

In some embodiments, the solid electrolyte comprises an antiperovskite base composition analogous to $Li_3OCl$ but with some or all of the oxygen atoms replaced with sulfur atoms. For example, the base composition may have the chemical formula $Li_3SX$ (X=F, Cl, Br . . . ). It has been observed that sulfides often have higher lithium ion diffusivity values than oxides, possibly due to relatively weak bonding between the lithium ion and the sulfur anion.

An antiperovskite is a compound having a crystal structure like a conventional perovskite but with the unit cell having the positive and negative species reversed. In a perovskite structure, the unit cell is face centered cubic. The negative atoms normally sit on the face centers and positive ions sit in the corners. Additionally, there will be a third type of atom, a cation, in the center of the cubic unit cell. In an antiperovskite structure, the locations of cations and anions are reversed. In the antiperovskite structure, of the type described herein, oxygen or sulfur atoms, for example, reside at centers of the unit cell, halogen atoms sit at corners of the unit cell, and lithium ions reside in the face centers of the unit cell. It is believed that the face centered species may be the most mobile species in the unit cell. Because a solid electrolyte should be conductive to lithium ions, it is useful to design a structure in which lithium ions sit in the face centers. The theory of this design is supported by the observation that $Li_3OX$ materials are many times more conductive to lithium ions than LiPON. See Zhao and Daemen, previously incorporated herein by reference. LiPON is reported to have a conductivity of approximately $2 \times 10^{-6}$ S/cm. Note that for battery cells employing cations other than lithium ions as the electrochemically active charge carrying species, the electrolyte may comprise an anti-perovskite structure in which the non-lithium cations sit in the face centered sites. Magnesium-based anti-perovskites are examples of such structure and will be described below.

In various embodiments, a variant of a base composition as described above (e.g., an Li$_3$OX or Mg$_3$AB antiperovskite) is employed to improve the lithium ion conductivity. The variation may involve introducing lithium or magnesium vacancies into the lattice of the base composition. This can be accomplished in any one of various ways. One technique involves aliovalent doping that requires lithium vacancy creation to maintain charge neutrality; for example replacing oxygen atoms in the lattice with halide ions or some other ion having a valence of −1 results in a positive lattice effective charge which is then balanced by lithium vacancies with a negative effective charge. In the cases of a Li$_3$OCl anti-perovskite, such aliovalent doping may be represented by the following equation:

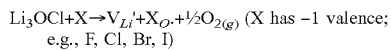
Li$_3$OCl+X→V$_{Li}$'+X$_O$·+½O$_{2(g)}$ (X has −1 valence; e.g., F, Cl, Br, I)

Or, in a specific example:

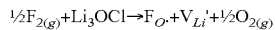
½F$_{2(g)}$+Li$_3$OCl→F$_O$·+V$_{Li}$'+½O$_{2(g)}$

In general, effective aliovalent doping involves replacing a first anion in the base structure with a second anion that has a valence more positive than that of the first atom. Examples include replacing oxygen with a halogen, replacing nitrogen or phosphorous with sulfur or oxygen or a halide, and replacing carbon with nitrogen, oxygen, or a halide.

Another approach to introducing cation deficiencies in a base composition involves simply removing some fraction of the oxygen ions or other anions within the base composition lattice. As with aliovalent doping, this approach introduces lithium or other cation vacancies. In the case of Li$_3$OCl, this approach may be represented by the following equation:

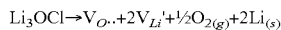
Li$_3$OCl→V$_O$··+2V$_{Li}$'+½O$_{2(g)}$+2Li$_{(s)}$

In this approach, substoichiometric oxygen concentration is compensated by lithium vacancies. Oxygen vacancies may be created at low oxygen partial pressures (P$_{O2}$), e.g. as experienced under reducing conditions prevalent at the anode. In some cases, a measure may be taken to prevent oxygen substoichiometry from being compensated by electrons. An example of such a measure would be a scheme to stabilize lithium vacancies relative to electrons: 1) by lowering the energy of a lithium vacancy. This may be done by controlling the lithium chemical potential in the electrolyte to be at a low (anodic) potential relative to lithium. 2) by raising the energy of electronic defects, by eliminating traps in the bandgap and by ensuring a large bandgap material (good electrolytes intrinsically have high bandgaps).

In another approach to producing cation deficiencies in a base composition, a vacancy in a second anion is introduced. Such vacancy may be executed alone or in combination with a vacancy in a primary anion. For example, in the case of Li$_3$OX, X vacancies may be introduced into the base composition. As an example, chloride vacancies may be introduced as represented by the following chemical equation:

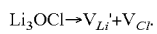
Li$_3$OCl→V$_{Li}$'+V$_{Cl}$·

By removing oxygen or other an ion (to create, e.g., oxygen vacancies) or by replacing it with an atom having a valence of minus one (−1), the lattice can accommodate less positive charge. This is a result of charge neutrality. Accommodating less positive charge in the lattice implies that lithium vacancies will be introduced into the lattice because lithium is the only positively charged species in the electrolyte. More lithium vacancies increase the conductivity in the case that current flows by a vacancy hopping mechanism. This hopping mechanism is analogous to the conduction of holes in a P-doped semiconductor device. Specie diffusivity is largely determined by the lattice (and temperature); while conductivity is related to diffusivity and specie concentration by the Nernst-Einstein relation whereby a higher concentration results in a linearly higher conductivity.

Various mechanisms may create anion vacancies and aliovalent doping to thereby introduce lithium vacancies into an antiperovskite structure. One mechanism simply involves replacing the appropriate fraction of oxygen atoms with halogen atoms in the precursor(s) used to create the antiperovskite. In order to introduce oxygen vacancies, it may be necessary to first form an antiperovskite with the full complement of oxygen atoms and then treat the fabricated material to remove the appropriate fraction of oxygen atoms. One mechanism for removing oxygen atoms is to expose material to a very low partial measure of oxygen environment. In some cases, a partial pressure in the range of about 1×10$^{-15}$ atm is sufficient. In some cases, a mechanism is provided to maintain the structure in the presence of the ambient oxygen. To this end, the cell can be constructed with an appropriate reducing agent proximate to the antiperovskite electrolyte. In one example, hydrogen or a hydride is provided to getter oxygen and keep it from reoccupying the antiperovskite matrix. In other embodiments, the lithium anode itself serves as an oxygen getter.

In some cases, the oxygen deficient electrolyte material is relatively stable. In such embodiments, the byproduct of removing the oxygen from the lattice is removed after fabrication, and then the layer of solid electrolyte is laminated with positive and negative electrodes and positive and negative current collectors to assemble a cell. The electrolyte in the cell may be placed into proximity with an oxygen getter material, which might be the lithium anode itself. In some implementations, this assembly is conducted in an environment to having a very low oxygen partial pressure.

Whichever mechanism is employed to introduce cation charge carrier deficiencies in the base composition, the result should be a significant reduction in the amount of cation in the lattice. In an ideal situation, from the perspective of cation conductivity, ½ the possible cation sites are occupied by cations. This state provides half of the cation lattice sites as vacancies, maximizing the chances that sites adjacent to cations will be vacant, which increases cation diffusivity, but with an adequate concentration cation charge carriers to permit the necessary vacancy hopping conduction. Of course, this ideal must be balanced against lattice stability and ease of fabrication.

In some examples, at least about 5% of oxygen (or other anions) in an antiperovskite (or other base structure) are replaced by aliovalent doping as described above and/or are removed to create anion vacancies. In some cases, between about 5 and 20% of the anions are replaced or removed. For example, at least about 5% of the valence −2 anions in a lithium deficient variant of the antiperovskite are replaced by vacancies and/or by atoms having a valence of −1. For example, about 5-20% of the oxygen or sulfur atoms in an antiperovskite may be replaced with halogen atoms. In other examples, about 5-20% of the oxygen or sulfur atoms in an antiperovskite are replaced with oxygen or sulfur vacancies.

To this point anti-perovskite, and particularly Li$_3$OCl, base compositions have been emphasized. It should be understood that other base compositions based on different crystal structures such as some anti-fluorite, anti-brownmillerite, and anti-K$_2$MgF$_4$ lattices may be employed. Some of these base compositions will be described below. In all cases, the base compositions may be varied as described above in the context of anti-perovskites to introduce anion vacancies or provide aliovalent doping.

In some embodiments, the base composition is identified by, or meets the criteria specified by, the following approach: (1) identify a perovskite or fluorite or brownmillerite, etc. that is a good conductor of an anion within the lattice (e.g., an oxygen-containing fluorite that is a good oxygen conductor); (2) make an anti-perovskite analog by replacing the anion with lithium (or magnesium) and by replacing the cation with an anion (e.g., the anion in the perovskite); and (3) produce a lithium (or magnesium) deficient variant of the anti-perovskite by (a) introducing vacancies of a negative valence atom in the anti-perovskite lattice, and/or (b) replacing the negative valence atom with an aliovalent atom having a more positive valence than the replaced atom. In various embodiments, the solid state composition has a band gap of approximately 4-6 eV (e.g., approximately 5 eV). Materials with band gaps in this range generally have adequate electronic resistivity and are sufficiently electrochemically stable for applications of interest.

In some cases, the anti-analog base composition produced as a result of operation (2) is highly conductive to the desired cation as a result of an intrinsic cation deficiency in the base composition. Such deficiency exists without the introduction of an anion vacancy or aliovalent doping. For example, some anti-pyrochlore base compositions are intrinsically cation-deficient in ⅛ of their cation sites. Such compositions which are intrinsically cation deficient may be employed without taking steps to introduce an anion vacancy or aliovalent doping. In other examples, a variant of such composition may be produced with anion vacancies and/or aliovalent doping.

In certain embodiments, a magnesium conducting solid state electrolyte is employed for magnesium ion batteries. The electrolyte may be a magnesium containing anti-perovskite. As an example, $Mg_3AB$ is used, where the total valence of AB is $-6$. In one example, A has a valence of $-2$ and B has a valence of $-4$ (e.g., O+C). Magnesium anti-perovskites such as $AsNMg_3$, $SbNMg_3$, and $Mg_3ZnN$ are known. In the case they have bandgaps below ~4 eV, the bandgap may be increased by creating stronger bonds in the structure. This may be done by making a material with species that bond more strongly to Mg than those listed above. For example, $Mg_3OC$ would be expected to have a larger bandgap than $Mg_3TeSn$. Variations on stoichiometric magnesium antiperovskites such as variants having aliovalent doping to induce Mg vacancies may be employed as solid state electrolytes.

In certain embodiments, a lithium conducting solid electrolyte having a fluorite crystal structure (based on $CaF_2$) is employed. Some oxygen-containing materials having fluorite crystal structure are good oxygen ion conductors (e.g., $CeO_2$, $ZrO_2$), especially when doped to increase oxygen vacancy concentration (e.g., GDC, YSZ). Compositions with anti-fluorite crystal structure having lithium as the cation may be used as base compositions for lithium conducting solid state electrolytes. Examples of such base structures include $Li_2O$—X and $Li_2S$—X (e.g. X=F, Cl, Br, I). When doped or otherwise modified as described above to increase the lithium vacancy concentration, such materials may be effective solid state electrolyte materials. Fluorine doping of a fluorite base composition may be represented by the following equation:

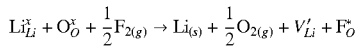

An example of another class of cation conducting base structures that may be employed comprises compounds having an anti-pyrochlore crystal structure. It is known that the pyrochlore structure ($A_2B_2O_7$, A valence is +3, B valence is +4) can be good oxygen ion conductors (e.g., $Gd_2Zr_2O_7$, $Gd_2Ti_2O_7$). It has a fluorite crystal structure with ⅛ of the oxygen sites vacant. An example of an anti-pyrochlore compound has the formula $A_2B_2Li_7$ and in some cases is a lithium ion conductor. A and B may each be single atoms or combinations of atoms that together have a valence of $-3$ (A) or $-4$ (B). One example of a suitable material has the formula $AA'B_2Li_7$, where A has a valence of $-1$ (F, Cl, Br, I), A' has a valence of $-2$ (O, S, Se, Te), and B has a valence of $-2$ (O, S, Se, Te). Another example of a suitable material has the formula $A_2BB'Li_7$, where A has a valence $-1$ (F, Cl, Br, I), B has a valence of $-2$ (O, S, Se, Te), and B' has a valence $-3$ (N, P, As, Sb). As the $A_2B_2Li_7$ anti-pyrochlore lithium ion conductor base structures intrinsically lack ⅛ of the possible lithium sites in the lattice, these materials may serve as solid state electrolytes without anion vacancies or aliovalent doping. In some embodiments, the anti-pyrochlore structures have anion vacancies and/or aliovalent doping.

An example of another class of cation conducting base structures that may be employed is the anti-δ $Bi_2O_3$ crystal structure. The δ $Bi_2O_3$ structure (anion-deficient fluorite structure with bismuth on the face centered cubic sites) is an known to be an excellent high temperature oxygen ion conductor, having an oxygen ion conductivity on the order of 1 S/cm. The anti-δ $Bi_2O_3$ structure ($A_2Li_3$) may be used as a lithium ion conducting solid electrolyte material. "A" may be a combination of atoms. For example, the compound may have the formula $AA'Li_3$, where A has a valence of $-1$ (e.g., F, Cl, Br, I) and A' has a valence of $-2$ (e.g., O, S, Se, Te).

Yet another example of a class of cation conducting base compositions is the anti-brownmillerite compounds. The oxide brownmillerite structure $A_2B_2O_5$ (e.g., $Sr_2Fe_2O_5$, $Ba_2In_2O_5$) is an oxygen ion conductor. Certain compounds having the anti-brownmillerite structure ($A_2B_2Li_5$) are useful as lithium ion conductors. Certain examples of such compounds have the structure $A_2BB'Li_5$, where A has a valence of $-1$ (e.g., F, Cl, Br, I), B has a valence of $-2$ (e.g., O, S, Se, Te), and B' has a valence of $-1$ (e.g., F, Cl, Br, I).

Still another example of cation conducting base compositions is the anti-$K_2MgF_4$ compounds. Certain oxides with the $K_2MgF_4$ structure $A_2BO_4$ are known to be oxygen ion conductors (e.g., $La_2NiO_4$). Examples of compounds with the anti-$K_2MgF_4$ structure $A_2BLi_4$ may be suitable lithium ion conductors for solid electrolytes. In certain embodiments, A has a valence of $-1$ (e.g., F, Cl, Br, I) and B has a valence of $-2$ (e.g., O, S, Se, Te).

Some solid electrolytes contain cation doping to create cation defects and thereby improve cation conductivity. As an example, a solid solution of the formula $(A,A')(B,B')(X,X')_3$ is employed, where A and A' represent two different species from the set (F, Cl, Br, I), B and B' represent two different species from the set (O, S, Se), and X and X' are from the set (Li, Na, K, Ag, Cu). In an example, the solid electrolyte has the formula $Li_{(3-z/2)}Mg_z)OCl$.

According to various embodiments, a solid state battery cell comprises a cation conducting solid electrolyte as described above. Some examples of cells that may employ such a solid electrolyte are presented in U.S. Provisional Patent Application No. 61/674,961 filed Jul. 24, 2012 and naming Holme et al. as inventors, which is incorporated herein by reference and appended hereto. In various embodiments, the cell includes (a) a solid electrolyte as described herein; (b) a positive electrode; and (c) a negative electrode comprising lithium metal or reversibly available lithium ions. The solid electrolyte is provided as a layer between and electronically separating the positive and negative electrodes. In certain implementations, the layer of solid electrolyte has a thickness of between about 10 nm and 50 um. In certain implementations, the layer of solid electrolyte has a thickness of between about 100 nm and 10 um. In some implementations, the positive electrode in a discharged state includes a metal (e.g., elemental iron, cobalt, manganese, or copper) and lithium fluoride. The positive electrode may contain an iron fluoride when in a fully charged state. In some implementations the positive electrode contains sulfur.

In some implementations, the positive electrode contains fluorine, sulfur and a metal in the fully charged state. The metal may be, for example, iron, manganese, cobalt or copper. At least some of the metal may exist as a fluoride, a sulfide, and/or a sulfur fluoride when the electrode is fully charged. When the positive electrode is discharged it may contain lithium fluoride and/or lithium sulfide, as well as the metal in its elemental or alloyed state.

Figure 14:
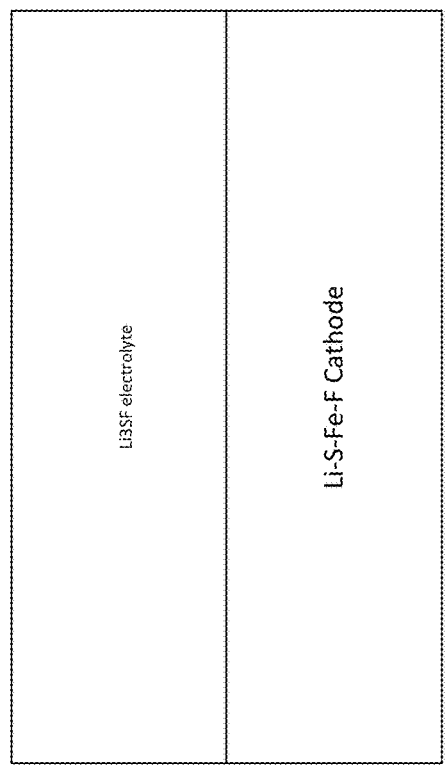
FIG. 14 is a simplified diagram illustrating an electrolyte-electrode interface according to an embodiment of the invention.

Some battery cells comprise a solid state electrolyte of the type described herein may include a positive electrode that is chemically similar to the electrolyte. Further, in such cells, the electrolyte and the positive electrode may lack a clearly defined or compositionally abrupt interface. In some cases, the composition varies gradually between the electrolyte and the positive electrode at the electrode/electrolyte interface. An example of such electrolyte-electrode interface is depicted in FIG. 14. FIG. 14 is a simplified diagram illustrating an electrolyte-electrode interface according to an embodiment of the invention.

The solid electrolytes described herein may be prepared by any of various techniques including all solid phase techniques as well as solution phase techniques, some of which are described above. Further the preparation may be performed under ambient conditions or in a controlled atmosphere such as a vacuum chamber. Physical and chemical vapor techniques and atomic layer deposition techniques may be employed. In certain embodiments, a solution phase technique is employed in which chemical precursors to the electrolyte are provided in solution. The solution is contacted with a substrate where the solvent is removed by, e.g., evaporation. Thereafter, or contemporaneously therewith, the precursors are reacted to form the solid electrolyte material. In some cases, the solution is deposited on the substrate where it is heated to evaporate or otherwise remove the solvent. Thereafter, the substrate is heated to a higher temperature whereupon the solid precursors react to form the electrolyte. The process may be conducted under conditions that promote formation of a smooth, defect-free film. Examples of defects to be avoided are pin holes and islands of the electrolyte. For example, addition of less than stoichiometric LiCl may result in Li deficiency, which can be compensated by proton incorporation from the $H_2O$ solution. The control of the pH of the solution may be used to control deposition rate.

Figure 15:
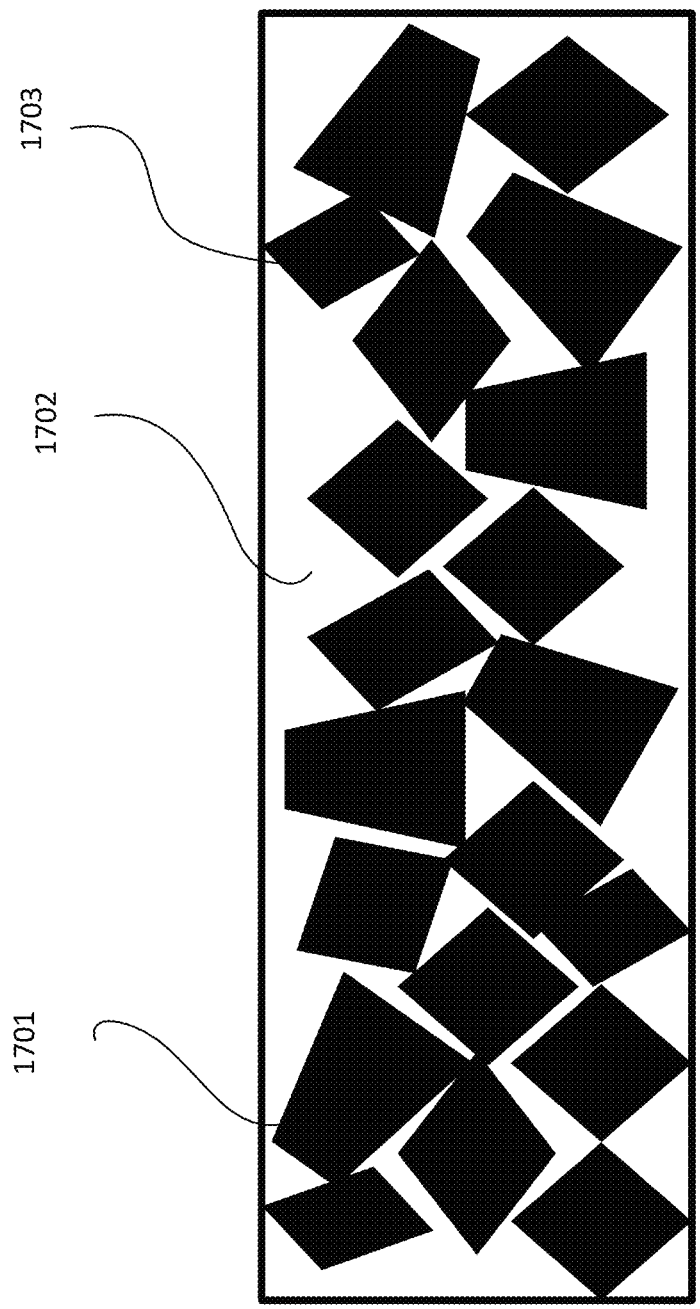
FIG. 15 is a simplified diagram illustrating a composite solid electrolyte structure.

FIG. 15 is a simplified diagram illustrating a composite solid electrolyte structure. As shown, crystalline and high conductivity electrolyte material is in powder form (e.g., particles 1701 and 1703). There openings or pore (e.g., opening 1702) among the electrolyte material. According to an embodiment, the openings among the electrolyte particles are filled with glassy electrolyte material formed from a liquid solution. According to another embodiment, the filling comprises polymer electrolyte (or PEO material). It is to be appreciated that that composite structure can provide advantage of high conductivity ($\sigma$) without requiring full density of material (which is hard to obtain, and if possible would require very high temperature processing).

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A solid electrolyte for a solid-state lithium ion or lithium metal cell, the solid electrolyte comprising:
    an antiperovskite having the formula $Li_{3-n}R_{1-z/2}X_zH_n$
        where R is O, S, Se, or Te and X is a halide;
    wherein the antiperovskite has a lithium ion conductivity of at least about $1\times10^{-5}$ S/cm at room temperature;
    wherein subscript n is from greater than 0 to less than or equal to 2;
    wherein subscript z is greater than 0.8; and
    wherein the lithium deficient variant of an antiperovskite has a lithium ion conductivity, $\sigma_i$, that is at least about $10^7$ times greater than its electronic conductivity, $\sigma_e$.

2. A solid state battery comprising:
    a solid electrolyte of claim 1;
    a positive electrode; and
    a negative electrode comprising lithium metal or reversibly available lithium ions.

3. The solid state battery of claim 2, wherein the positive electrode comprises a metal and lithium fluoride when in a discharged state.

4. The solid electrolyte for a solid-state lithium ion or lithium metal cell of claim 1, wherein the antiperovskite is doped with aluminum.

5. The solid electrolyte for a solid-state lithium ion or lithium metal cell of claim 1, wherein n is from greater than 0 to less than 0.5.

* * * * *